(12) United States Patent
Takeda et al.

(10) Patent No.: US 11,764,899 B2
(45) Date of Patent: Sep. 19, 2023

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/316,525

(22) PCT Filed: Jul. 10, 2017

(86) PCT No.: PCT/JP2017/025130
§ 371 (c)(1),
(2) Date: Jan. 9, 2019

(87) PCT Pub. No.: WO2018/012457
PCT Pub. Date: Jan. 18, 2018

(65) Prior Publication Data
US 2020/0186279 A1    Jun. 11, 2020

(30) Foreign Application Priority Data
Jul. 12, 2016   (JP) .................................. 2016-137917

(51) Int. Cl.
*H04L 1/00* (2006.01)
*H04L 5/00* (2006.01)
(Continued)

(52) U.S. Cl.
CPC .......... *H04L 1/0026* (2013.01); *H04L 5/0082* (2013.01); *H04W 24/10* (2013.01); *H04W 72/0446* (2013.01); *H04W 72/23* (2023.01)

(58) Field of Classification Search
CPC .... H04L 1/0026; H04L 5/0082; H04W 72/23; H04W 24/10; H04W 72/0446
See application file for complete search history.

(56) References Cited

U.S. PATENT DOCUMENTS 9,232,428 B2 *   1/2016   Abe ....................... H04W 24/10
9,253,765 B2 *   2/2016   Nam ..................... H04L 5/0023
(Continued)

FOREIGN PATENT DOCUMENTS

CN           105493433 A      4/2016

OTHER PUBLICATIONS

3GPP TSG RAN WG1 Meeting #84bis; R1-162945 "Channel design for shortened TTI in FDD" MediaTek Inc.; Busan, Korea; Apr. 11-15, 2016 (6 pages).
(Continued)

*Primary Examiner* — Jael M Ulysse
(74) *Attorney, Agent, or Firm* — Osha Bergman Watanabe & Burton LLP

(57) ABSTRACT

Communication is appropriately performed even when a short TTI and/or processing time reduction are introduced. A user terminal that communicates with a cell that uses at least a reduced TTI shorter than a period of a subframe includes: a reception section that receives from the cell a report request that triggers channel state information (CSI) reporting; and a control section that controls the CSI reporting in a subframe unit or a short TTI unit based on the report request.

5 Claims, 20 Drawing Sheets

(51) Int. Cl.
H04W 24/10 (2009.01)
H04W 72/0446 (2023.01)
H04W 72/23 (2023.01)

(56) References Cited

U.S. PATENT DOCUMENTS

| | | | | |
|---|---|---|---|---|
| 9,954,667 | B2* | 4/2018 | Papasakellariou | H04L 5/001 |
| 11,177,866 | B2* | 11/2021 | Aiba | H04W 72/23 |
| 2006/0274712 | A1* | 12/2006 | Malladi | H04L 1/1671 |
| | | | | 370/345 |
| 2013/0142163 | A1* | 6/2013 | Liu | H04L 5/0053 |
| | | | | 370/329 |
| 2015/0173066 | A1* | 6/2015 | Gao | H04L 1/06 |
| | | | | 370/329 |
| 2016/0087778 | A1* | 3/2016 | Damnjanovic | H04L 1/0027 |
| | | | | 370/329 |
| 2016/0285535 | A1 | 9/2016 | Kim et al. | |
| 2017/0006491 | A1* | 1/2017 | Chen | H04L 1/1861 |
| 2017/0012757 | A1* | 1/2017 | Suzuki | H04L 1/0027 |
| 2018/0302916 | A1* | 10/2018 | Lee | H04L 5/0012 |
| 2019/0028162 | A1* | 1/2019 | Lee | H04L 5/0053 |
| 2019/0037563 | A1* | 1/2019 | Lyu | H04L 1/0001 |
| 2019/0104006 | A1* | 4/2019 | Wang | H04L 27/2602 |
| 2019/0123881 | A1* | 4/2019 | Lee | H04L 1/1896 |
| 2019/0140725 | A1* | 5/2019 | Aiba | H04W 72/0446 |
| 2019/0349046 | A1* | 11/2019 | Liu | H04B 7/0626 |

OTHER PUBLICATIONS

Extended European Search Report issued in European Application No. 17827584.8, dated Feb. 5, 2020 (8 pages).
International Search Report issued for PCT/JP2017/025130, dated Sep. 12, 2017 (4 pages).
Written Opinion issued for PCT/JP2017/025130, dated Sep. 12, 2017 (4 pages).
Huawei, HiSilicon; "Discussion on CSI feedback for short TTI"; 3GPP TSG RAN WG1 Meeting #85 R1-164065; Nanjing, China, May 23-27, 2016 (3 pages).
Samsung; "Discussion on sPUSCH"; 3GPP TSG RAN WG1 Meeting #85 R1-164796; Nanjing, China, May 23-27, 2016 (2 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Sharp, MTI; "Shortened TTI for DL transmissions"; 3GPP TSG RAN WG1 Meeting #85 R1-164999; Nanjing, China, May 23-27, 2016 (4 pages).
Office Action in counterpart Indian Patent Application No. 201917000217 dated Jul. 26, 2021 (6 pages).
3GPP TSG RAN WG1 Meeting #85; R1-164650 "Design of UL channels for shortened TTI" Lenovo; Nanjing, China; May 23-27, 2016 (4 pages).
Office Action issued in European Application No. 17827584.8; dated Jul. 30, 2021 (7 pages).
Office Action issued in European Application No. 17827584.8; dated Feb. 16, 2023 (9 pages).
Office Action issued in Mexican Application No. MX/a/2019/000448; dated Feb. 24, 2023 (5 pages).
Office Action issued in European Application No. 17827584.8; dated Jul. 22, 2022 (5 pages).
Office Action issued in Chinese Application No. 201780043401.7; dated Oct. 13, 2022 (10 pages).

* cited by examiner

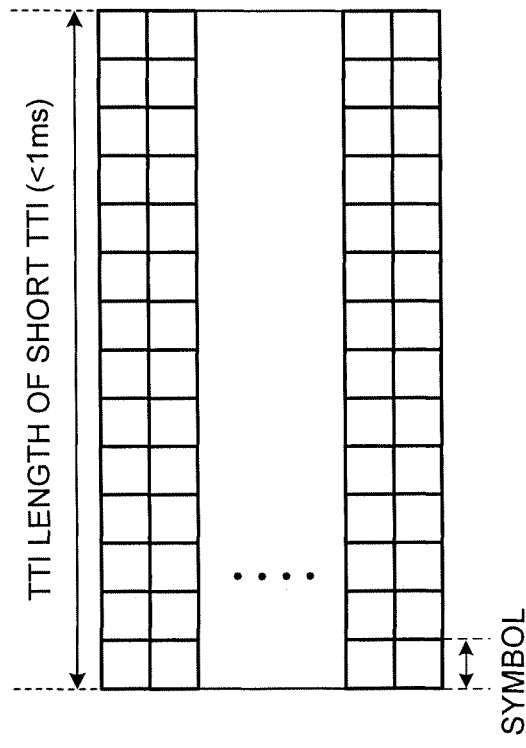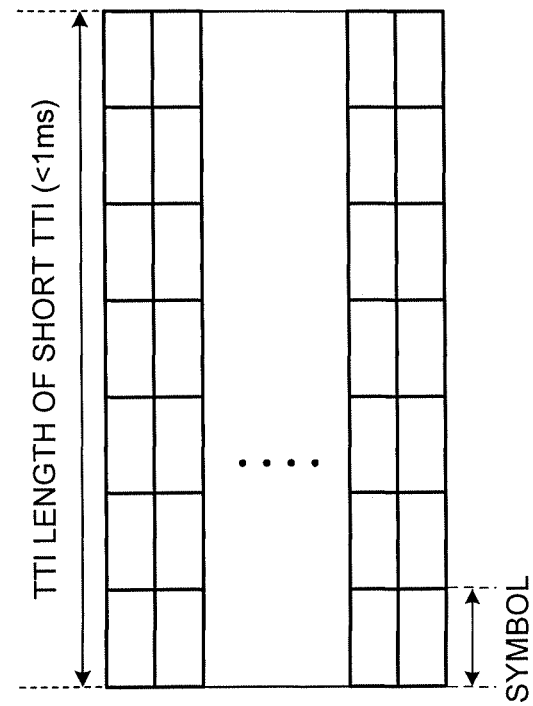
FIG. 3A
FIG. 3B

FIG. 4A
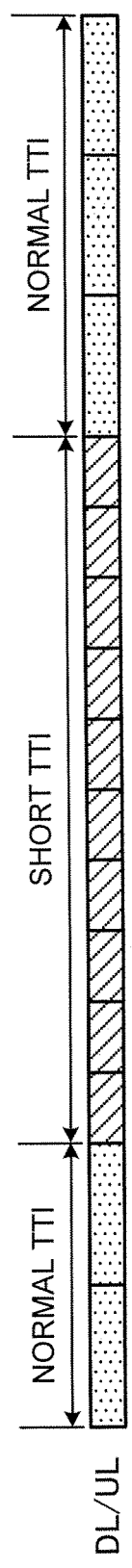
FIG. 4B
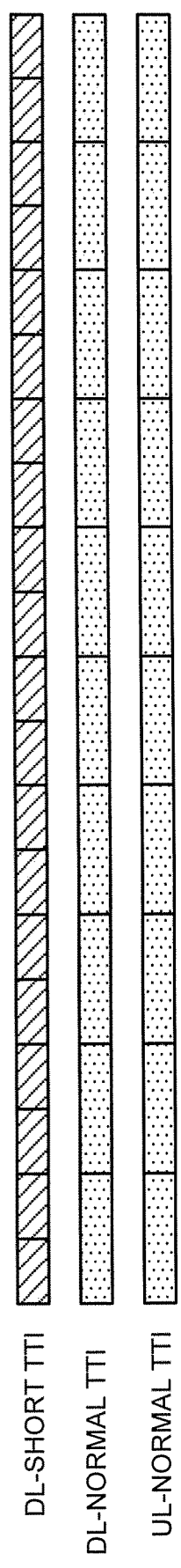
FIG. 4C

USER TERMINAL AND RADIO COMMUNICATION METHOD

TECHNICAL FIELD

The present invention relates to a user terminal and a radio communication method of a next-generation mobile communication system.

BACKGROUND ART

In Universal Mobile Telecommunications System (UMTS) networks, for the purpose of higher data rates and low latency, Long Term Evolution (LTE) has been specified (Non-Patent Literature 1). For the purpose of wider bands and a higher speed than LTE (also referred to as LTE Rel. 8), LTE Advanced (also referred to LTE Rel. 10, 11 or 12) has been specified, and successor systems (systems subsequent to LTE Rel. 13) have been also studied.

LTE Rel. 10/11 have introduced Carrier Aggregation (CA) that aggregates a plurality of Component Carriers (CC) to obtain a wider band. A system band of LTE Rel. 8 μs one unit that composes each CC. Further, according to CA, a plurality of CCs of the same radio base station (eNB: eNodeB) is set to a user terminal (UE: User Equipment).

On the other hand, LTE Rel. 12 has introduced Dual Connectivity (DC), too, that sets a plurality of Cell Groups (CG) of different radio base stations to user terminals. Each cell group includes at least one cell (CC). DC aggregates a plurality of CCs of the different radio base stations. Therefore, DC is also referred to as Inter-eNB CA.

When CA is performed, a Primary Cell (PCell) that is a highly reliable cell that secures connectivity and a Secondary Cell (SCell) that is subsidiary cell are set to each user terminal.

The UE connects with the PCell first, and then can additionally connect with the SCell if necessary. The PCell is the same cell as a single cell (stand-alone cell) that supports Radio Link Monitoring (RLM) and Semi-Persistent Scheduling (SPS). The SCell is a cell set to the UE in addition to the PCell.

In the existing LTE system, an uplink signal is mapped on an appropriate radio resource and transmitted from a user terminal to a radio base station apparatus. Uplink user data is transmitted by using an uplink shared channel (PUSCH: Physical Uplink Shared Channel). Further, Uplink Control Information (UCI) is transmitted by using the PUSCH when transmitted together with uplink user data, and is transmitted by using an uplink control channel (PUCCH: Physical Uplink Control Channel) when transmitted alone.

The Uplink Control Information (UCI) includes transmission acknowledgement (ACK/NACK) for a downlink shared channel (PDSCH: Physical Downlink Shared Channel), a scheduling request, and Channel State Information (CSI). The Channel State Information (referred to as the CSI below) is information based on an instantaneous channel state of downlink, and is, for example, a Channel Quality Indicator (CQI), a Precoding Matrix Index (PMI) or a Rank Indicator (RI). This CSI is notified periodically or aperiodically from the user terminal to the radio base station.

Aperiodic Channel State Information (Aperiodic CSI) is notified from the user terminal to the radio base station apparatus in response to a trigger from the radio base station apparatus. This trigger (Aperiodic CSI triggering) is included in an uplink scheduling grant (referred to as an UpLink (UL) grant below) transmitted on a downlink control channel (PDCCH: Physical Downlink Control Channel).

The user terminal notifies the Aperiodic Channel State Information (also referred to as the A-CSI below) by using the PUSCH designated by the UL grant in response to the trigger included in the UL grant. Such A-CSI notification is also referred to as Aperiodic Channel State Information Reporting (Aperiodic CSI (CQI/PMI/RI) Reporting).

Further, the existing systems (LTE Rel. 8 to 12) have introduced Frequency Division Duplex (FDD) that performs DownLink (DL) transmission and UpLink (UL) transmission in different frequency bands, and Time Division Duplex (TDD) that temporarily switch between the DL transmission and the UL transmission in the same frequency band.

The above existing systems set a Transmission Time Interval (TTI) that is applied to DL transmission and UL transmission between a radio base station and a user terminal, to 1 ms to control. The transmission time interval is also referred to as a transfer time interval, and the TTI according to the LTE systems (Rel. 8 to 12) is also referred to as a subframe length.

CITATION LIST

Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

Future radio communication systems (e.g., 5G and NR) are assumed to be requested to realize various radio communication services while meeting different request conditions (e.g., an ultra high speed, a large volume and ultra low latency).

For example, it has been studied that 5G provides radio communication services called enhanced Mobile Broad Band (eMBB), Internet of Things (IoT), Machine Type Communication (MTC), Machine To Machine (M2M), and Ultra Reliable and Low Latency Communications (URLLC). In addition, M2M may be called Device To Device (D2D) and Vehicular To Vehicular (V2V) depending on devices that perform communication. In order to meet requests for the various types of communication, it has been studied to design a new communication access scheme (New Radio Access Technology (RAT)).

Communication latency reduction has been studied to provide sufficient communication service of such future radio communication systems. For example, it has been studied to perform communication by using a TTI (that may be also referred to as a short TTI, shortened TTI, or reduced TTI for example) configured by reducing a Transmission Time Interval (TTI) that is a scheduling minimum time unit compared to 1 ms of the existing LTE systems (LTE Rel. 8 to 12). Alternatively, it has been studied to apply a shorter processing time than the existing LTE systems to realize processing time reduction.

However, the existing LTE systems control communication timings in subframe (1 ms) units, yet do not yet specify how to control communication in order to introduce the short TTI and/or processing time reduction.

As described above, according to the Aperiodic Channel State Information (A-CSI) reporting operation of the existing LTE systems, when receiving a report request (CSI trigger) for instructing transmission of channel state information, a user terminal performs transmission by using a subframe that comes after a predetermined period. Introduction of the short TTI and/or the processing time reduction brings a problem of how to control transmission and reception of the CSI trigger and channel state information based on the CSI trigger. Thus, it has been demanded to provide a control method that can appropriately perform communication when performing communication by using the short TTI and/or the processing time reduction.

The present invention has been made in light such a problem. One of objects of the present invention is to provide a user terminal and a radio communication method that, even when a short TTI and/or processing time reduction are introduced, can appropriately perform communication.

Solution to Problem

One aspect of a user terminal according to the present invention is a user terminal that communicates with a cell that uses at least a short TTI shorter than a period of a subframe, and that includes: a reception section that receives from the cell a report request that triggers channel state information (CSI) reporting; and a control section that controls the CSI reporting in a subframe unit or a short TTI unit based on the report request.

Advantageous Effects of Invention

According to the present invention, even when a short TTI and/or processing time reduction are introduced, it is possible to appropriately perform communication.

BRIEF DESCRIPTION OF DRAWINGS

FIGS. 3A and 3B are diagrams illustrating configuration examples of the short TTI.

FIGS. 4A to 4C are diagrams illustrating setting examples of the normal TTI and the short TTI.

DESCRIPTION OF EMBODIMENTS

As described above, future radio communication systems are demanded to meet communication latency reduction, and it has been studied to reduce signal transmission/reception processing times compared to the existing LTE systems. A method for realizing processing time reduction is considered to include controlling communication in subframe units similar to the existing LTE systems, and setting a shorter processing time than processing times of the existing LTE systems. Alternatively, the method for realizing the processing time reduction is considered to include introducing a short TTI shorter than a period of a subframe (1 ms) of the existing LTE systems, and controlling signal transmission/reception.

When the processing time shorter than the processing times of the existing LTE systems is set, a user terminal applies a timing earlier than signal transmission/reception timings defined by the existing LTE systems and controls signal transmission/reception. When, for example, receiving channel state information report request (CSI trigger) from a subframe n, each existing system transmits a CSI by a subframe (e.g., subframe n+k (k≥4)) that comes after a predetermined period.

When the processing time reduction is set, the user terminal performs control to transmit the CSI at a timing (e.g., subframe n+k' (k'<4)) earlier than the subframe n+k. In this case, even when communication is controlled in existing subframe units, it is possible to reduce a processing time of an A-CSI report. The short processing time may be defined in advance according to a specification, or may be notified to the user terminal by using higher layer signaling and/or physical layer signaling (e.g., downlink control channel).

Further, when a short TTI that is a shorter period than subframes of the existing LTE systems is introduced, the user terminal transmits and/or receives signals by using the short TTI. Hereinafter, a general TTI and the short TTI will be described with reference to FIGS. 1 to 4.

Figure 1:
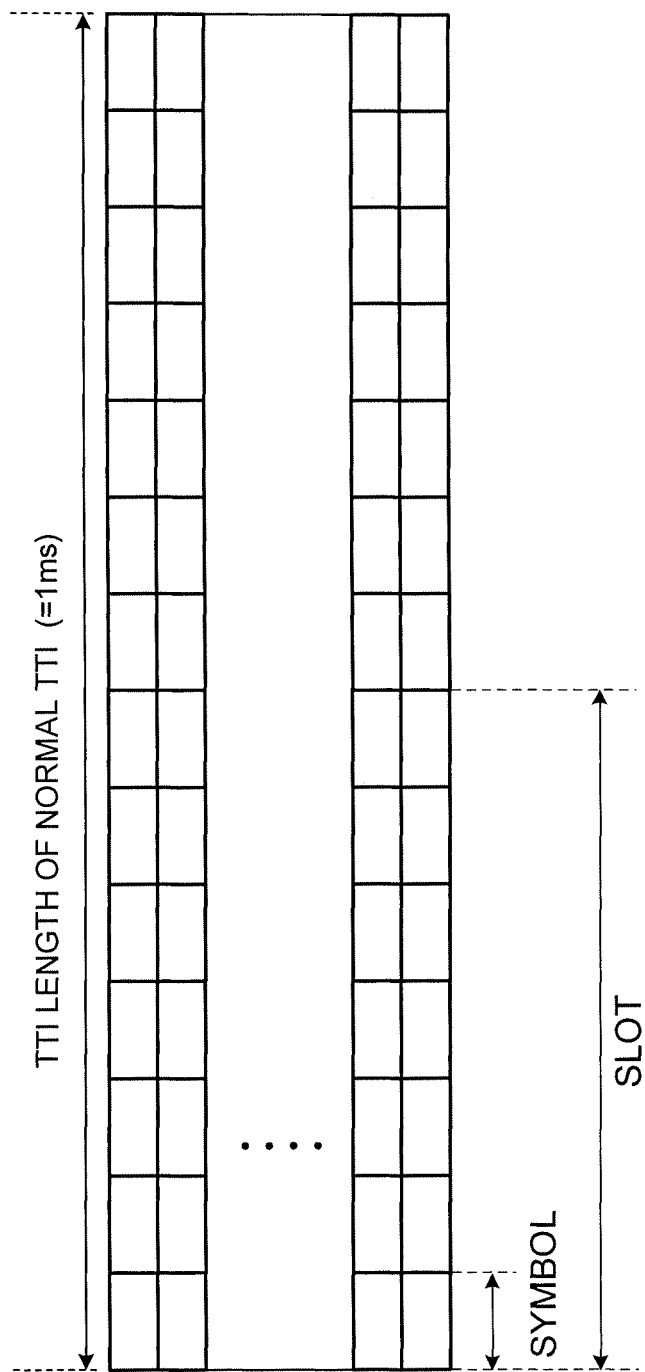
FIG. 1 is a diagram illustrating an example of a Transmission Time Interval (TTI) according to existing LTE systems (Rel. 8 to 12).

FIG. 1 is an explanatory view of an example of a Transmission Time Interval (TTI) according to the existing systems (LTE Rel. 8 to 12). As illustrated in FIG. 1, the TTI (referred to as a "general TTI" below) according to LTE Rel.

8 to 12 has 1 ms in time duration. The general TTI is also referred to as a subframe, and includes two time slots. The TTI is a transmission time unit of one data packet (transport block) subjected to channel coding, and is a processing unit of scheduling and link adaptation.

As illustrated in FIG. 1, in a case of a general Cyclic Prefix (CP) on DownLink (DL), the general TTI is configured to include 14 Orthogonal Frequency Division Multiplexing (OFDM) symbols (7 OFDM symbols per slot). Each OFDM symbol has 66.7 µs in time duration (symbol length), and is added a general CP of 4.76 µs. The symbol length and a subcarrier interval have a relationship of a reciprocal. Therefore, when the symbol length is 66.7 µs, the subcarrier interval is 15 kHz.

Further, in a case of the general Cyclic Prefix (CP) in UpLink (UL), the general TTI is configured to include 14 Single Carrier Frequency Division Multiple Access (SC-FDMA) symbols (7 SC-FDMA symbols per slot). Each SC-FDMA symbol has 66.7 µs in time duration (symbol length), and is added a general CP of 4.76 µs. The symbol length and the subcarrier interval have a relationship of a reciprocal. When the symbol length is 66.7 µs, the subcarrier interval is 15 kHz.

In addition, in a case of an extended CP, the general TTI may be configured to include 12 OFDM symbols (or 12 SC-FDMA symbols). In this case, each OFDM symbol (or each SC-FDMA symbol) has 66.7 µs in time duration, and is added the extended CP of 16.67 µs.

Figure 2:
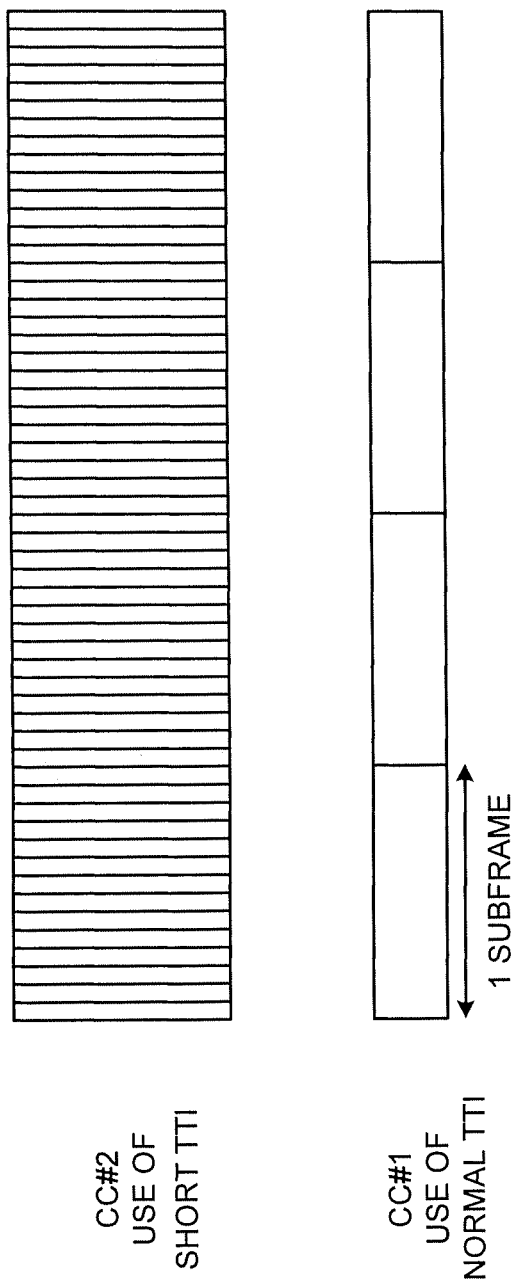
FIG. 2 is a diagram for explaining a normal TTI and a short TTI.

FIG. 2 illustrates an example where the short TTI short compared to 1 ms of the TTI length is used to perform communication. In addition, FIG. 2 illustrates a cell (CC #1) that uses a general TTI (1 ms), and a cell (CC #2) that uses the short TTI.

When the short TTI is used, it is considered to change the subcarrier interval from a subcarrier of the general TTI (e.g., expand a subcarrier interval). When a TTI (also referred to as a "short TTI" below) having a shorter time duration than the general TTI is used, time margins of processing (e.g., coding and decoding) of user terminals and radio base stations increase, so that it is possible to reduce processing latency. Further, when the short TTI is used, it is possible to increase the number of user terminals that can be accommodated per unit time (e.g., 1 ms). A configuration of the short TTI will be more specifically described below.

(Configuration Example of Short TTI)

The configuration example of the short TTI will be described with reference to FIG. 3. As illustrated in FIGS. 3A and 3B, the short TTI has a time duration (TTI length) shorter than 1 ms. The short TTI may be one or a plurality of TTI lengths such as 0.5 ms, 0.25 ms, 0.2 ms and 0.1 ms whose multiples are 1 ms. Alternatively, in a case of a general CP, the general TTI includes 14 symbols, and therefore may be one or a plurality of TTI lengths such as 7/14 ms, 4/14 ms, 3/14 ms, 2/14 ms and 1/14 ms which are integer multiples of 1/14 ms. Further, in the case of the extended CP, the general HI includes 12 symbols, and therefore may be one or a plurality of TTI lengths such as 6/12 ms, 4/12 ms, 3/12 ms, 2/12 ms and 1/12 ms which are integer multiples of 1/12 ms.

In addition, similar to conventional LTE, in a case of the short TTI, too, whether to use the general CP or the extended CP can be configured by higher layer signaling such as broadcast information or RRC signaling. Consequently, it is possible to maintain compatibility (synchronization) with the general TTI that is 1 ms, and introduce the short TTI.

In addition, the case of the general CP will be described as an example with reference to FIGS. 3A and 3B. However, the present invention is not limited to this. The short TTI only needs to be a time duration shorter than the general TTI, and the number of symbols of the short TTI, a symbol length and a CP length may be configured in any way. Further, examples where OFDM symbols are used for DL and SC-FDMA symbols are used for UL will be described below. However, the present invention is not limited to these.

FIG. 3A is a diagram illustrating a first configuration example of the short TTI. As illustrated in FIG. 3A, in the first configuration example, the short TTI includes 14 OFDM symbols (or SC-FDMA symbols) the number of which is the same as that of the general TTI. Each OFDM symbol (each SC-FDMA symbol) has a symbol length shorter than a symbol length (=66.7 µs) of the general TTI.

As illustrated in FIG. 3A, when the number of symbols of the general TTI is maintained and the symbol length is short, a physical layer signal configuration (RE arrangement) of the general TTI can be appropriated. Further, when the number of symbols of the general TTI is maintained, the short TTI can include the same information amount (bit amount) as the general TTI.

Furthermore, the symbol length and the subcarrier interval have a relationship of a reciprocal. Therefore, when the symbol length is short as illustrated in FIG. 3A, the subcarrier interval is wider than 15 kHz of the general TTI. When the subcarrier interval widens, it is possible to effectively prevent an inter-channel interference due to Doppler shift during movement of the user terminal, and transmission quality deterioration due to phase noise of a receiver of the user terminal. At a high frequency band such as several tens of GHz in particular, it is possible to effectively prevent transmission quality deterioration by widening the subcarrier interval.

FIG. 3B is a diagram illustrating a second configuration example of the short TTI. As illustrated in FIG. 3B, in the second configuration example, the short TTI includes the number of OFDM symbols (or SC-FDMA symbols) smaller than that of the general TTI. Each OFDM symbol (each SC-FDMA symbol) has the same symbol length (=66.7 µs) as the general TTI. In this case, the short TTI can be configured in symbol units of the general TTI (configured by reducing the number of symbols). For example, part of symbols of the 14 symbols included in one subframe can be used to compose the short TTI. In FIG. 3B, the short TTI includes seven OFDM symbols (SC-FDMA symbols) that are half as that of the general TTI.

As illustrated in FIG. 3B, when the symbol length is maintained and the number of symbols is short, the information amount (bit amount) included in the short TTI can be short compared to the general TTI. Consequently, the user terminal can perform reception processing (e.g., demodulation and decoding) of information included in the short TTI in a shorter time than the general TTI, and reduce processing latency. Further, the symbol length is made the same as that of the existing systems, so that a signal of the short TTI and a signal of the general TTI can be subjected to frequency multiplexing in the same system band (or carrier, cell or CC) and it is possible to maintain compatibility with the general TTI.

For example, a frame configuration type 1 (FDD) can use the short TTI (sTTI) including two symbols and/or one slot of the existing systems, and transmit a downlink control channel (also referred to as, for example, a sPDCCH) and/or a downlink shared channel (also referred to as, for example, a sPDSCH). Further, the frame configuration type 1 (FDD) can use the short TTI including at least one of two symbols, four symbols and one slot, and transmit an uplink control channel (also referred to as, for example, a sPUCCH) and/or an uplink shared channel (also referred to as, for example, a sPUSCH). Alternatively, a frame configuration type 2 (TDD) can use the short TTI including one slot, and transmit at least one of the sPDCCH, the sPDSCH, the sPUCCH and the sPUSCH.

(Setting Example of Short TTI)

The setting example of the short TTI will be described. When the short TTI is applied, both of the general TTI and the short TTI can be configured to be set to the user terminal to maintain compatibility with the existing systems (LTE Rel. 8 to 12). FIG. 4 contains diagrams illustrating setting examples of the general TTI and the short TTI. In addition, FIG. 4 is exemplary illustrations. The present invention is not limited to this.

FIG. 4A is a diagram illustrating a first setting example of the short TTI. As illustrated in FIG. 4A, the general TTIs and the short TTI may exist temporarily in a mixed manner in the same Component Carrier (CC) (frequency domain). More specifically, the short TTI may be set to specific subframes (or specific radio frames) of the same CC. For example, in FIG. 4A, the short TTI is set to five continuous subframes of the same CC, and the general TTIs are set to the other subframes. For example, the specific subframes may be subframes to which MBSFN subframes can be set, or subframes that include (or do not include) specific signals such MIBs or synchronization channels. In addition, the number and positions of subframes to which the short TTI is set are not limited to those illustrated in FIG. 4A.

FIG. 4B is a diagram illustrating a second example of the short TTI. As illustrated in FIG. 4B, CCs of the general TTI and CCs of the short TTI may be aggregated to perform Carrier Aggregation (CA) or Dual Connectivity (DC). More specifically, the short TTI may be set to specific CCs (more specifically, DL and/or UL of the specific CCs). For example, in FIG. 4B, the short TTI is set to DL of the specific CCs, and the general TTI is set to DL and UL of other CCs. In addition, the number and positions of CCs to which the short TTI is set are not limited to those illustrated in FIG. 4B.

Further, in a case of CA, the short TTI may be set to specific CCs (a Primary (P) cell or/and a Secondary (S) cell) of the same radio base station. On the other hand, in a case of the DC, the short TTI may be set to specific CCs (the P cell or/and the S cell) in a Master Cell Group (MCG) formed by a first radio base station, or may be set to specific CCs (a Primary Secondary (PS) cells or/and a S cell) in a Secondary Cell Group (SCG) formed by a second radio base station.

FIG. 4C is a diagram illustrating a third setting example of the short TTI. As illustrated in FIG. 4C, the short TTI may be set to one of DL and UL. For example, FIG. 4C illustrates that a TDD system sets the general TTI to UL and sets the short TTI to DL.

Further, a specific channel and a signal on DL or UL are allocated (set) to the short TTI. For example, an uplink control channel (PUCCH: Physical Uplink Control Channel) may be allocated to the general TTI. An uplink shared channel (PUSCH: Physical Uplink Shared Channel) may be allocated to the short TTI. In this case, the user terminal can transmit the PUCCH by using the general TTI, and transmits the PUSCH by using the short TTI.

Further, a multiple access scheme different from OFDM (or SC-FDMA) that is a multiple access scheme of LTE Rel. 8 to 12 may be allocated (set) to the short TTI.

When the above short TTI is introduced, the user terminal is assumed to control signal transmission/reception by using the short TTI (or the short TTI and a subframe). When, for example, the short TTI is set, and the user terminal receives a CSI trigger from the subframe n (a short TTI # nx included in the subframe n), the user terminal is assumed to perform control to transmit an A-CSI at a timing earlier than the subframe n+k. The timing that is earlier than the subframe n+k is assumed to be, for example, a subframe n+k' (or a short time # nx+t included in the subframe n+k').

By the way, when receiving an uplink DCI format or a RAR grant from a given subframe (e.g., SF # n), a user terminal of the existing LTE system makes the A-CSI report by using an uplink shared channel by a subframe (e.g., SF # n+k) that comes after a predetermined period. Further, the existing LTE system is specified to perform communication assuming that the user terminal does not receive a plurality of A-CSI report requests (two or more triggers) for one given subframe (see FIG. 5).

Figure 5:
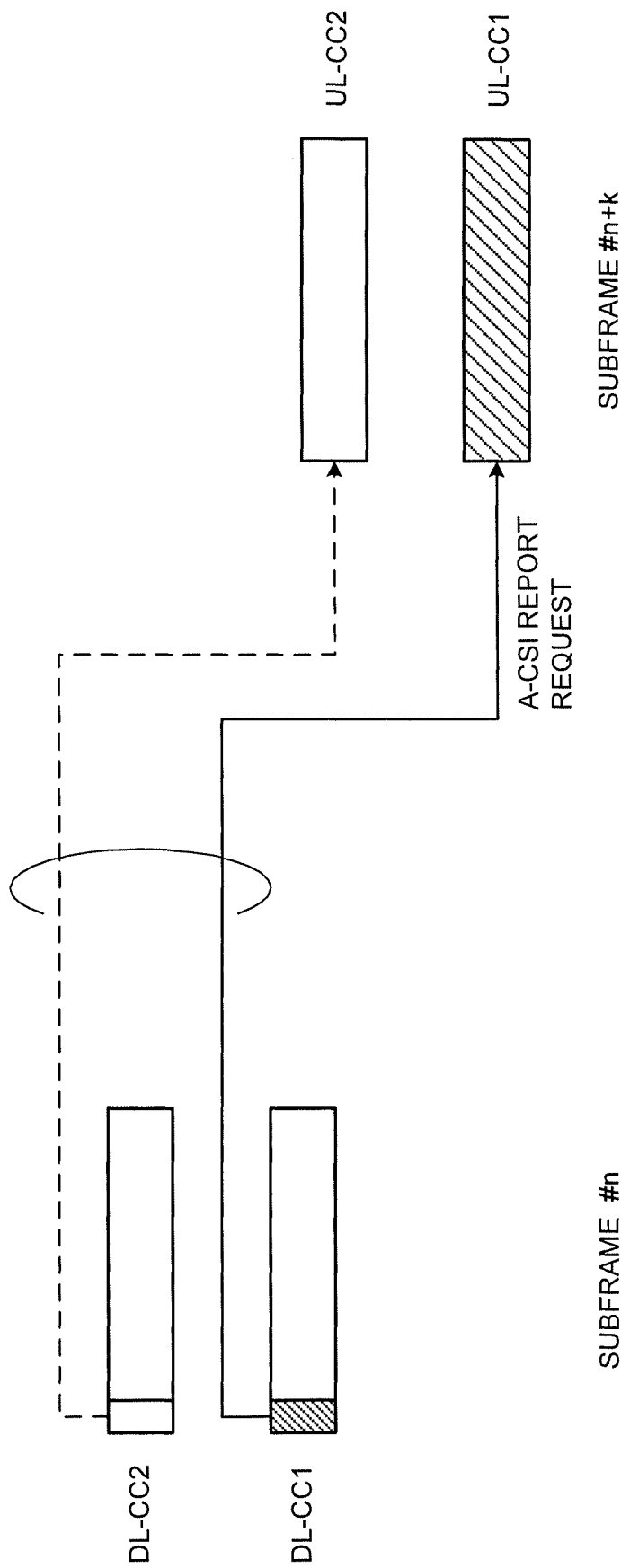
FIG. 5 is a diagram illustrating an example of an A-CSI transmission method of an existing LTE system.

FIG. 5 illustrates that a user terminal that performs communication by using a plurality of cells (a CC1 and a CC2 in this case) receives a CSI report request (CSI trigger) from the SF # n, and transmits the CIS by the SF # n+k. In this case, the radio base station makes the CSI report request (a trigger for requesting the CSI report in the SF # n+k) transmitted by the subframe # n by using one CC (the CC1 in this case) of a plurality of CCs.

That is, the report request for triggering the CSI reported by a given subframe is made by using one uplink control information (UL grant) or RAR grant. The radio base station does not need to request the user terminal to make a plurality of CSI reports for the same subframe. Hence, the radio base station only needs to control transmission of the CSI trigger (downlink control information) such that the user terminal does not doubly transmit the CSI reports.

Thus, the existing LTE systems define the A-CSI reporting operation (transmission timing). Further, a timing (e.g., a value of k) at which the user terminal transmits the A-CSI after receiving the CSI trigger is defined according to a frame configuration (FDD/TDD).

On the other hand, when the short TTI and/or processing time reduction are introduced, how to control transmission and reception of the channel state information based on the CSI trigger for instructing transmission of channel state information and the CSI trigger is not yet specified. When, for example, the CSI trigger is transmitted by using the short TTI, there is a problem of how to control transmission of the CSI (e.g., a transmission unit).

The inventors of the invention have focused on a configuration where, when the short TTI is introduced, a subframe includes a plurality of short TTIs, and focused on controlling transmission and reception of a CSI trigger for instructing transmission of a CSI and/or the CSI based on the CSI trigger in subframe units and/or short TTI units.

For example, the user terminal controls transmission of the CSI in the subframe units or the short TTI units based on the CSI report request (CSI trigger) included in the UL grant. In this case, the user terminal can control reception of the CSI trigger assuming that a predetermined number of (e.g., one) CSI reports are made per subframe or per short TTI. Thus, by controlling transmission and reception of the CSI trigger for instructing transmission of the CSI and/or the CSI based on the CSI trigger in the subframe unit and/or the short time units, it is possible to appropriately perform communication even when the short TTI and/or the processing time reduction are introduced.

Further, the future radio communication systems are also assumed to perform communication between a user terminal and a radio base station by using the same cell or a plurality of cells to which different TTIs and/or different processing times are applied. In such a case, how to control transmission and reception of the CSI trigger and the CSI based on the CSI trigger matters.

As one aspect of the present embodiment, the inventors of the invention have focused on performing reception assuming not to receive a plurality of CSI triggers for instructing transmission of the CSI report by the same subframe or same short TTI when communication is performed with one cell or a plurality of cells to which different TTI lengths and/or different processing times are applied.

Alternatively, as one aspect of the present embodiment, the inventors of the invention have focused on controlling transmission of one or a plurality of CSIs based on predetermined conditions when communication is performed with one cell or a plurality of cells to which different TTI lengths and/or different processing times are applied and when a plurality of CSI triggers for instructing transmission of CSI reports by the same subframe and/or the same short TTI are received.

The present embodiment will be described in detail below. In the following description, a TTI whose TTI length is shorter than 1 ms will be referred to as a short TTI, yet may be referred to as a short TTI, a short subframe or a short subframe. Further, a TTI that is 1 ms will be referred to as a general TTI, yet may be referred to as a normal TTI, a long TTI, a subframe, a general subframe, a normal subframe or a long subframe. Furthermore, the configurations illustrated in FIGS. 1 to 4 are applicable to the short TTI according to the present embodiment.

Further, transmission and reception of Aperiodic Channel State Information (A-CSI) will be described as an example below. However, signals to which the present embodiment is applicable are not limited to these. The present embodiment is applicable to at least a configuration where a user terminal transmits signals based on an instruction (e.g., a trigger) from a radio base station. Further, the LTE system will be described as an example below. However, the present embodiment is not limited to this, and is applicable to systems that use the short TTI and/or the processing time reduction. Further, a plurality of aspects described below may be carried out alone or can be optionally carried out in combination.

(First Aspect)

The first aspect will describe a case where a short TTI is introduced, and transmission and reception of a CSI trigger for instructing transmission of an A-CSI and/or the CSI based on the CSI trigger are controlled in subframe units.

Figure 6:
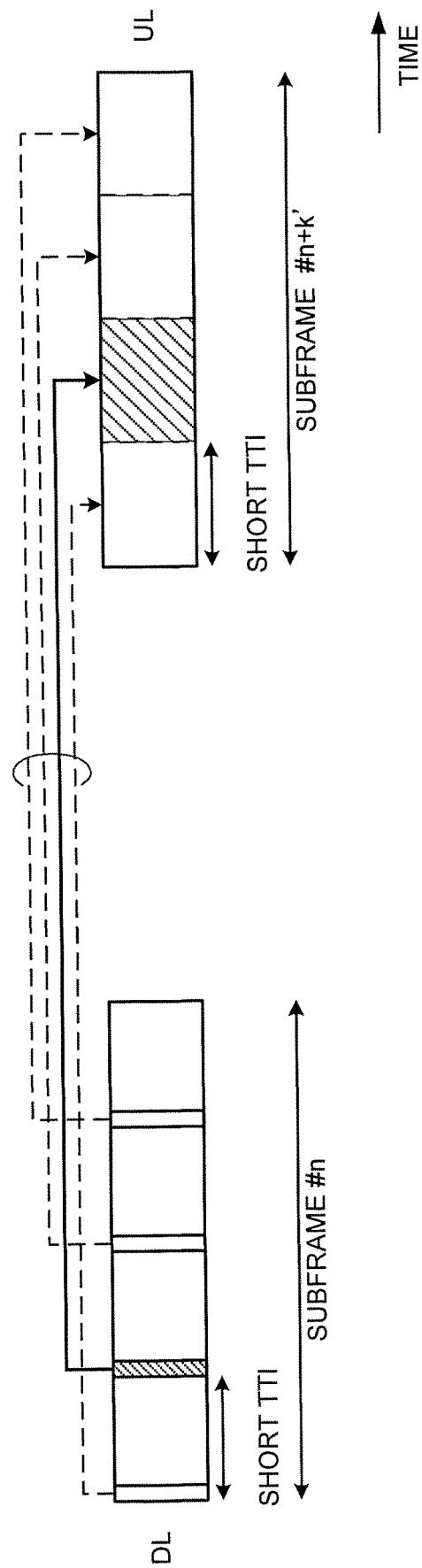
FIG. 6 is a diagram illustrating an example of an A-CSI transmission method according to the present embodiment.

FIG. 6 illustrates an example of a CSI reporting operation in a case where transmission of the CSI is controlled in the subframe units. That is, a radio base station and a user terminal are controlled to make one CSI report by one subframe.

FIG. 6 illustrates that a SubFrame (SF) includes four short TTIs. The radio base station transmits the CSI trigger (downlink control information) to the user terminal by using the one short TTI included in a downlink SF # n. The user terminal having received the CSI trigger transmits a CSI by an uplink SF # n+k that comes after a predetermined processing time (k' in this case). In this case, the user terminal transmits the CSI by the one short TTI included in the SF # n+k'. In addition, k' takes a value (e.g., k'<4 ms) shorter than a processing time of the CSI reporting operation of the existing LTE systems.

Thus, the user terminal performs control to transmit only the CSI based on the one CSI trigger per subframe. Even when, for example, the short TTI (e.g., a TTI of a sPUSCH) for transmitting the CSI is shorter than a subframe, the user terminal performs control to transmit only the CSI based on one CSI trigger per subframe.

Even when the radio base station transmits a CSI trigger by using the short TTI, the user terminal assumes not to receive a plurality of (two or more) triggers for the CSI to be transmitted by a given subframe. When, for example, the CSI trigger for instructing transmission of the CSI by the SF # n+k' is received from one short TTI included in the SF # n in FIG. 6, the user terminal can perform reception processing assuming that the CSI trigger is not transmitted by other short TTIs.

Thus, when the short TTI is introduced, it possible to limit the number of times of transmission of the CSI per subframe to once at maximum by controlling transmission and reception of the CSI trigger and/or the CSI in the subframe units. Consequently, it is possible to suppress an increase in a control load of the terminal compared to the existing systems. For example, the user terminal does not need to have capability of processing another CSI in parallel from a time of reception of the CSI trigger at a given timing to transmission of the CSI.

Further, when the same cell (CC) or a plurality of cells to which different TTI lengths and/or different processing times are applied are set, the user terminal can perform control to transmit only the CSI based on one CSI trigger per subframe. In this case, the user terminal can perform reception processing assuming not to receive a plurality of CSI triggers transmitted by a given subframe (e.g., the SF n+k').

Figure 7:
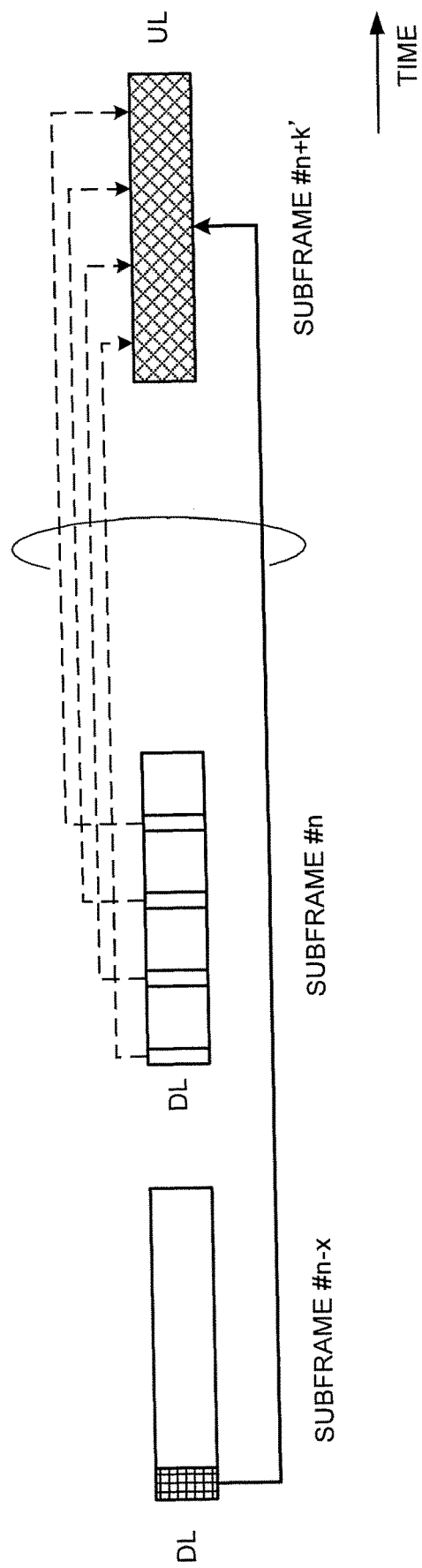
FIG. 7 is a diagram illustrating another example of the A-CSI transmission method according to the present embodiment.

FIG. 7 illustrates an example of a CSI reporting operation in a case where different TTIs are set in a time direction in the same cell (see, for example, FIG. 4A). In addition, FIG. 7 assumes that a processing time of a UL grant transmitted by a subframe (1 ms–TTI) is x+k', and a processing time of a UL grant transmitted by the short TTI is k'.

This is a case where the UL grant (trigger) for instructing transmission of the CSI by using a PUSCH of the SF # n+k' is transmitted by an SF # n–x. In this case, the user terminal assumes that the UL grant (downlink control information for scheduling a PUSCH of the short TTI included in the SF n+k') transmitted by the SF # n does not include the UL grant (trigger) for instructing transmission of the CSI by the SF # n+k'.

Thus, the user terminal can assume not to receive a CSI trigger of a predetermined subframe from other subframes when receiving a trigger for instructing transmission of a CSI of the predetermined subframe (the SF # n+k' in this case) from the given subframe (SF # n–x). In this case, the user terminal performs control to transmit only the CSI based on one CSI trigger per subframe based on the trigger. Consequently, it is possible to suppress A-CSI collision in the same subframe, and suppress an increase in an overhead caused by transmission of the CSI trigger.

Figure 8:
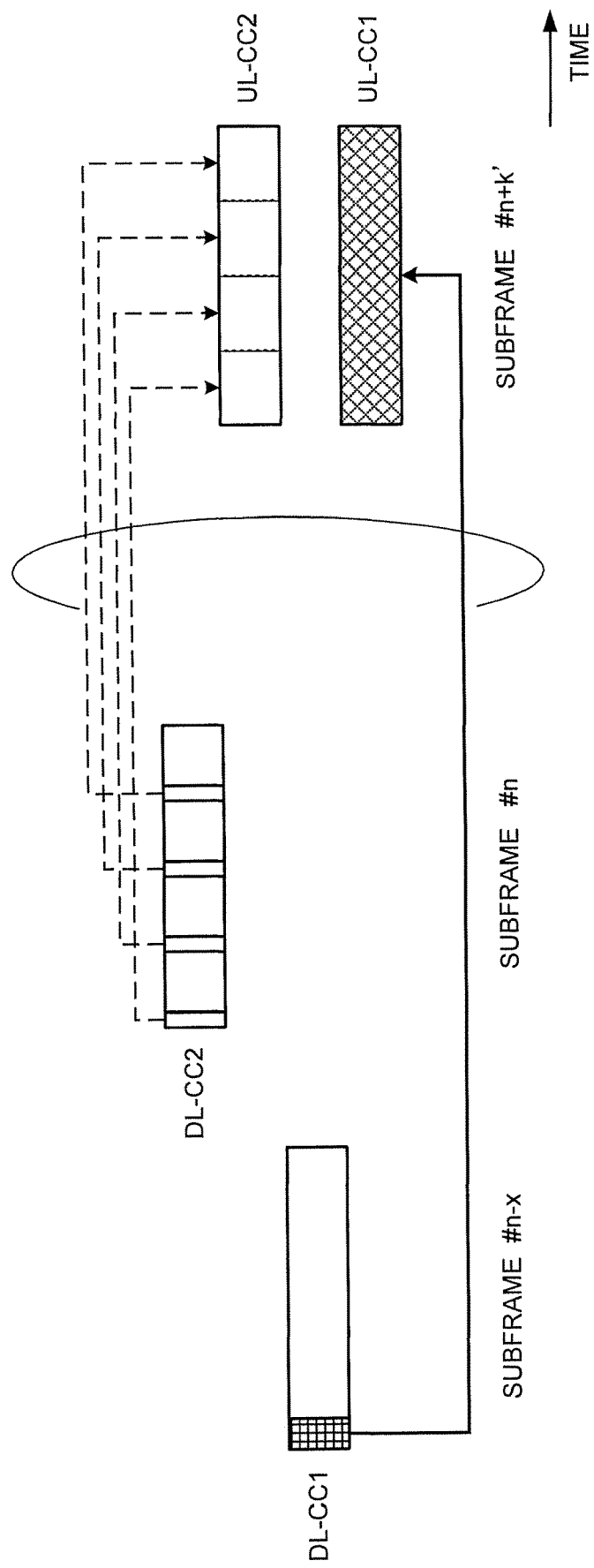
FIG. 8 is a diagram illustrating another example of the A-CSI transmission method according to the present embodiment.

FIG. 8 illustrates an example of a CSI reporting operation in a case where communication (e.g., UL-CA) is performed with a plurality of CCs to which different TTIs are applied (see FIG. 4B). This is a case where a UL grant for instructing transmission of a CSI by using a PUSCH of the uplink SF # n+k' of a CC1 is transmitted by the downlink SF # n–x. In this case, the user terminal assumes that a UL grant (downlink control information for scheduling a sPUSCH of the short TTI included in an SF # n+k' of a CC2) transmitted by the downlink SF # n of the CC2 does not include a trigger for instructing transmission of the CSI by the SF # n+k'.

Thus, the user terminal can assume not to receive a CSI trigger of a predetermined subframe from other CCs and subframes when receiving a trigger for instructing transmission of a CSI of a predetermined subframe (the SF # n+k' in this case) from a given subframe (the SF # n+k' of the CC1). In this case, even when the user terminal connects with a plurality of CCs, the user terminal performs control to transmit only the CSI based on one CSI trigger per subframe. Consequently, it is possible to suppress A-CSI collision in the same subframe, and suppress an increase in an overhead caused by transmission of the CSI trigger.

(Second Aspect)

The second aspect will describe a case where a short TTI is introduced, and transmission and reception of a CSI trigger for instructing transmission of a CSI, and the CSI based on the CSI trigger are controlled in short TTI units.

Figure 9A:
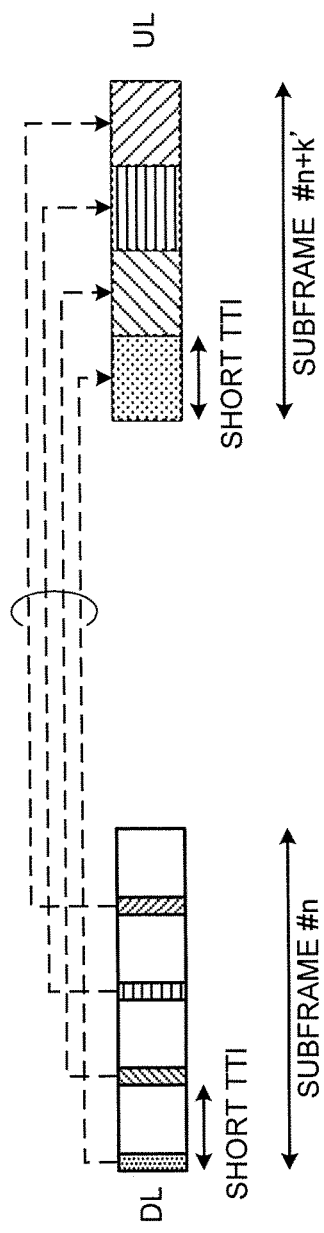
FIGS. 9A and 9B are diagrams illustrating another example of the A-CSI transmission method according to the present embodiment.

FIG. 9A illustrates an example of a CSI reporting operation in a case where transmission of a CSI is controlled in the short TTI units. That is, a radio base station and a user terminal make CSI reports based on one CSI trigger per short TTI.

FIG. 9A illustrates that a subframe includes four short TTIs. The radio base station can transmit the CSI trigger to the user terminal by using each short TTI included in an SF # n. The user terminal having received the CSI trigger transmits a CSI by an SF # n+k' that comes after a predetermined processing time (k' in this case). This is a case where the user terminal transmits the CSIs by using the four short TTIs included in the SF # n+k'. In addition, k' can take a value (e.g., k'<4 ms) shorter than a processing time of the CSI reporting operation of the existing LTE systems.

In this case, the user terminal performs control to transmit only the CSI based on one CSI trigger per short TTI based on the received trigger. Consequently, when the short TTI (e.g., a TTI of a sPUSCH) for transmitting the CSI is shorter than a subframe, the user terminal can transmit the CSI based on a plurality of CSI triggers by one subframe.

In addition, FIG. 9A illustrates that the CSIs are transmitted by all short TTIs included in the subframe. However, the present invention is not limited to this, and can transmit the CSI by using at least one short TTI. Further, control may be performed to transmit a CSI by a plurality of short TTIs based on one CSI trigger (e.g., a trigger included in a head short TTI included in a subframe). This can be realized by, for example, including an information element for instructing by which short TTI CSI transmission is triggered in a control signal (DCI) including a CSI trigger or by setting by which short TTI the CSI transmission is triggered by higher layer signaling. In this case, it is possible to reduce transmission of the CSI trigger and suppress an increase in an overhead.

Further, the user terminal can perform reception processing assuming not to receive a plurality of (two or more) CSI triggers transmitted by the same short TTI. For example, the user terminal assumes to receive from a different short TTI or subframe a CSI trigger for instructing transmission of the CSI by each short TTI included in the SF # n+k'.

Thus, when the short TTI is introduced, it is possible to transmit a plurality of CSIs by one subframe by controlling transmission and reception of the CSI trigger and/or the CSI in the short TTI units. In this case, by reporting CSIs measured in different cells or RSs or reporting CSIs of different CSI processes as a plurality of CSIs transmitted in the same subframe, multiple types of CSIs can be reported in a short time. Consequently, it is possible to improve accuracy of adaptive control and scheduling control of base stations.

Further, when the same cell (CC) or a plurality of cells to which different TTIs and/or different processing times are applied are set, the user terminal can perform control to transmit only a CSI based on one CSI trigger per short TTI.

In this case, the user terminal can perform reception processing assuming not to receive a plurality of CSI triggers transmitted by using at least a given short TTI.

Figure 9B:
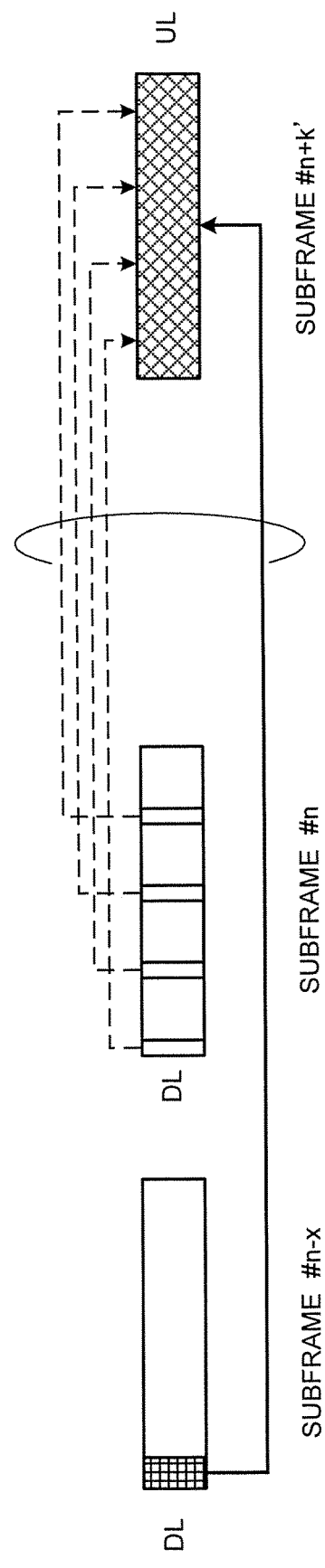

FIG. 9B illustrates an example of a CSI reporting operation in a case where different TTIs are set in a time direction in the same cell (see, for example, FIG. 4A). In addition, FIG. 9B assumes that a processing time of a UL grant transmitted by a subframe (1 ms-TTI) is x+k', and a processing time of a UL grant transmitted by a short TTI is k'.

This is a case where a UL grant (trigger) for instructing transmission of a CSI by using a PUSCH of the SF # n+k' is transmitted by the SF # n−x. In this case, the user terminal assumes that the UL grant (downlink control information for scheduling a sPUSCH of each short TTI included in the SF n+k') of each short TTI transmitted by the SF # n does not include a trigger for instructing transmission of the CSI by the SF # n+k'.

Thus, the user terminal can assume not to receive a CSI trigger of a predetermined subframe from another subframe when receiving a trigger for instructing transmission of the CSI of the predetermined subframe (SF # n+k') from a given subframe (the SF # n−x in this case). That is, when the CSI report in the short TTI included in the SF # n+k' is scheduled by the UL grant, the user terminal does not receive the CSI trigger from the short TTI that is scheduled to make the CSI report. Consequently, it is possible to suppress A-CSI collision in the same TTI, and suppress an increase in an overhead caused by transmission of the CSI trigger. In addition, the same control is applicable to a case, too, where communication (e.g., CA) is performed with a plurality of CCs to which different TTIs are applied.

(Third Aspect)

The third aspect will describe a case where a short TTI is introduced and transmission of a plurality of CSIs by the same short TTI is permitted.

Figure 10:
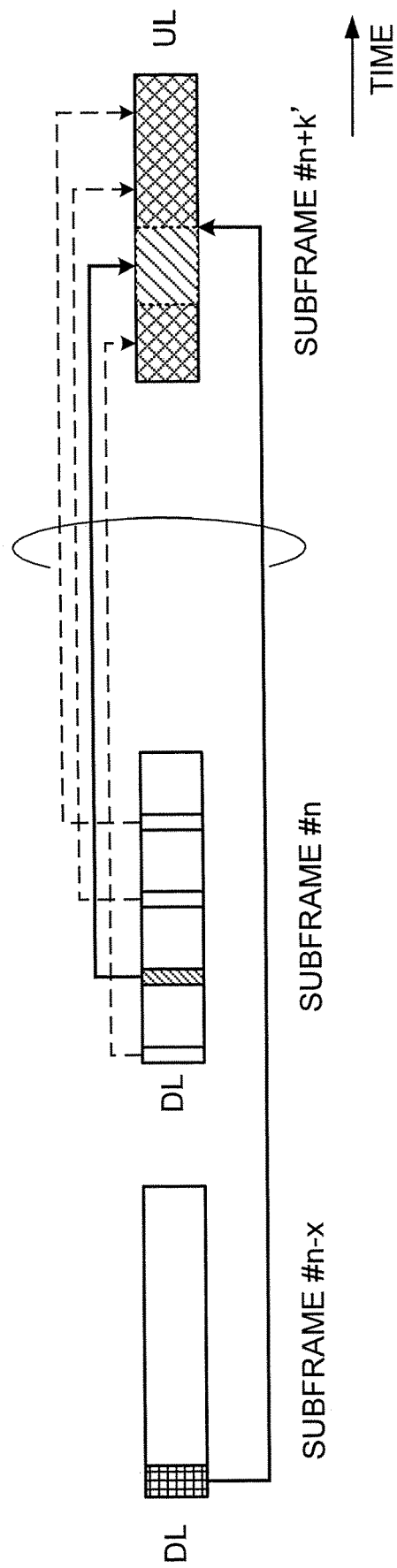
FIG. 10 is a diagram illustrating another example of the A-CSI transmission method according to the present embodiment.

FIG. 10 illustrates an example of a CSI reporting operation in a case where different TTIs are set in a time direction in the same cell (see, for example, FIG. 4A). In addition, FIG. 10 assumes a case where a processing time of a UL grant transmitted by a subframe is x+k' and a processing time of a UL grant transmitted by a short TTI is k'.

This is a case where a UL grant for instructing transmission of a CSI by an SF # n+k' is transmitted by an SF # n−x, and a UL grant for instructing transmission of a CSI by a short TTI included in an SF # n+k' is transmitted by a short TTI included in an SF # n. That is, a radio base station is permitted to transmit a plurality of triggers for instructing transmission of the CSI by using the same short TTI.

In this case, a user terminal assumes to be able to receive a plurality of (two or more) triggers for a CSI report from a predetermined short TTI. Further, the user terminal can transmit the CSI by the same short TTI, too, i.e., transmit the CSI based on a plurality of CSI triggers by one subframe.

When the user terminal receives a plurality of triggers for the CSI transmission that uses a predetermined short TTI, the user terminal can transmit a plurality of CSIs based on a plurality of triggers (see FIG. 10). FIG. 10 illustrates that the user terminal transmits the CSI based on a UL grant (A-CSI trigger) of the SF # n−x and a UL grant (A-CSI trigger) of the short TTI included in the SF # n.

Alternatively, when the user terminal receives a plurality of triggers for the CSI transmission that uses the predetermined short TTI, the user terminal may perform control to transmit only a CSI that is based on a specific CSI trigger, based on predetermined conditions. That is, when receiving a plurality of triggers for the CSI transmission that uses the predetermined short TTI, the user terminal performs control to transmit a CSI that is based on a predetermined number of (e.g., one in the subframe and/or a short TTI) of CSI triggers, based on the predetermined conditions.

Figure 11A:
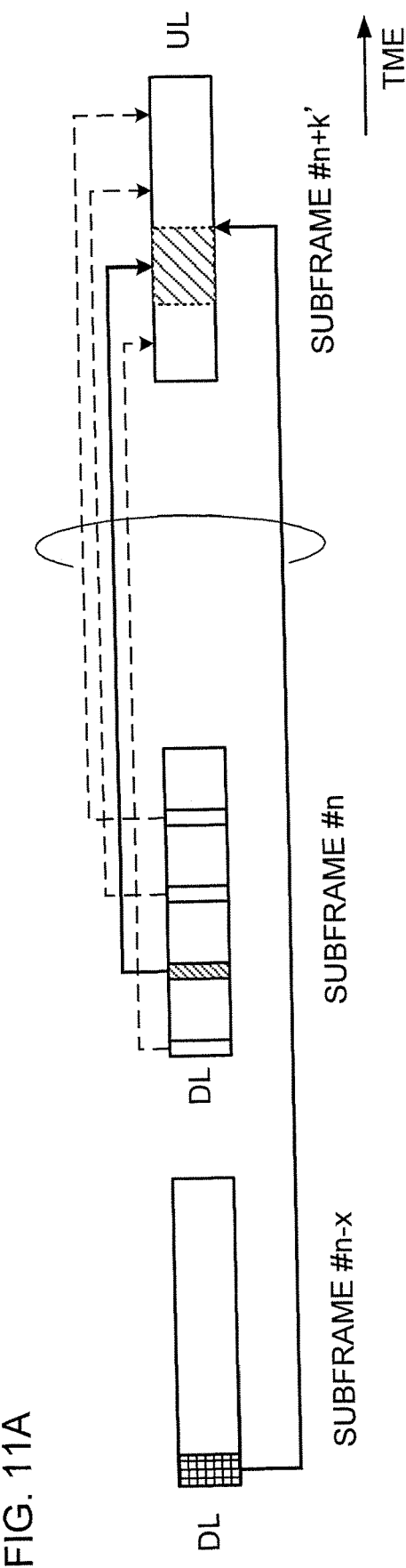
FIGS. 11A and 11B are diagrams illustrating another example of the A-CSI transmission method according to the present embodiment.

FIG. 11A illustrates that, when the user terminal receives a plurality of triggers for CSI transmission that uses a predetermined short TTI, the user terminal controls the CSI transmission based on a lately (latest) received CSI trigger (latest A-CSI report request). More specifically, FIG. 11A illustrates that the user terminal performs the CSI transmission based on a second CSI trigger among a first CSI trigger received from the SF # n−x and the second CSI trigger received from the short TTI included in the SF # n. In this case, it is possible to perform a CSI reporting operation by using the latest CSI trigger instructed by a radio base station. Consequently, a base station scheduler can overwrite a past CSI trigger that requires a long processing time with a CSI trigger to which a short processing time such as the short TTI is set. As a result, it is possible to perform scheduling that takes into account the latest traffic state or channel quality.

Figure 11B:
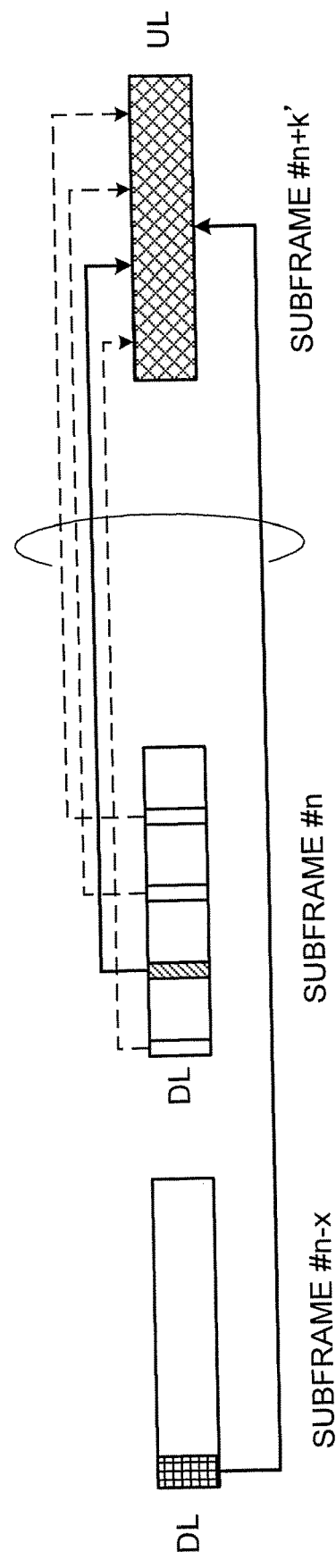

FIG. 11B illustrates that, when the user terminal receives a plurality of triggers for CSI transmission that uses the predetermined short TTI, the user terminal controls the CSI transmission based on a firstly received CSI trigger (oldest A-CSI report request). More specifically, FIG. 11B illustrates that the user terminal performs the CSI transmission based on a first CSI trigger among the first CSI trigger received from the SF # n−x and a second CSI trigger received from the short TTI included in the SF # n. In this case, while a long processing time such as a non-short TTI is presumed, a CSI trigger included in a highly reliably control signal (DCI) is preferentially used. Consequently, it is possible to perform highly reliable scheduling control.

Figure 12:
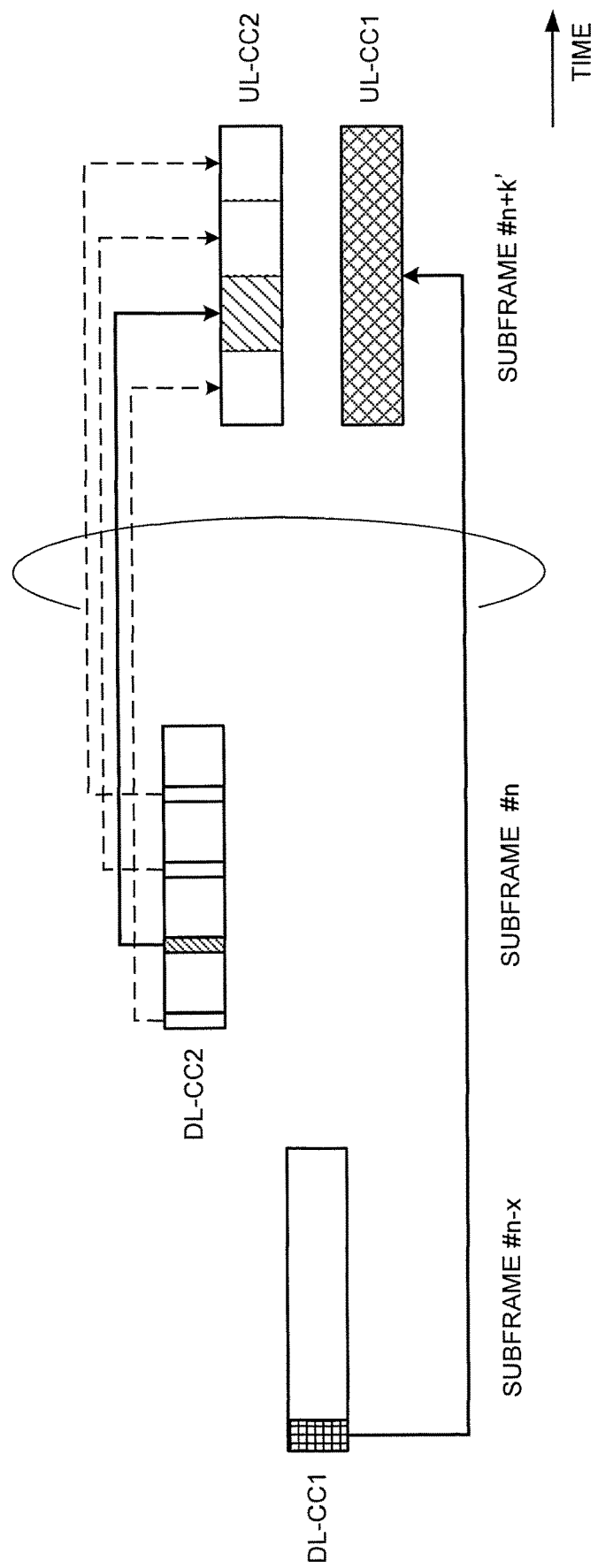
FIG. 12 is a diagram illustrating another example of the A-CSI transmission method according to the present embodiment.

FIG. 12 illustrates an example of a CSI reporting operation in a case where communication (e.g., CA) is performed with a plurality of CCs to which different TTIs are applied (see FIG. 4B). This is a case where a UL grant for instructing transmission of a CSI by the SF # n+k' of a CC1 is transmitted by the SF # n−x, and a UL grant for instructing transmission of a CSI by a short TTI included in the SF # n+k' of a CC2 is transmitted by the short TTI in the SF # n. That is, the radio base station is permitted to transmit a plurality of triggers for instructing the CSI transmission of each CC that uses the same short TTI.

In this case, the user terminal assumes to be able to receive a plurality of (two or more) triggers for the CSI report that uses the same short TTI between a plurality of CCs. Further, the user terminal can perform CSI transmission by the same short TTI between a plurality of CCs, too, i.e., CSI transmission based on a plurality of CSI triggers by one subframe.

When the user terminal receives a plurality of triggers for the CSI transmission that uses the same short TTI between different CCs, the user terminal can transmit a plurality of CSIs based on a plurality of triggers (see FIG. 12). FIG. 12 illustrates that the user terminal performs the CSI transmission based on the UL grant (A-CSI trigger) transmitted from the CC1 by the SF # n−x and the UL grant (A-CSI trigger) transmitted from the CC2 by the short included in the SF # n. In this case, the user terminal concurrently transmits the CSI to the CC1 and the CC2 by part of the short TTIs included in the SF # n+k'.

Alternatively, when receiving a plurality of triggers for CSI transmission that uses the same short TTI between different CCs, the user terminal may perform control to transmit the CSI based on a specific CSI trigger based on predetermined conditions. That is, when receiving a plurality of triggers for the CSI transmission that uses the same short TTI between the different CCs, the user terminal performs control to transmit the CSI based on a predetermined number of (e.g., one in a subframe and/or a short TTI) CSI triggers based on the predetermined conditions.

Figure 13:
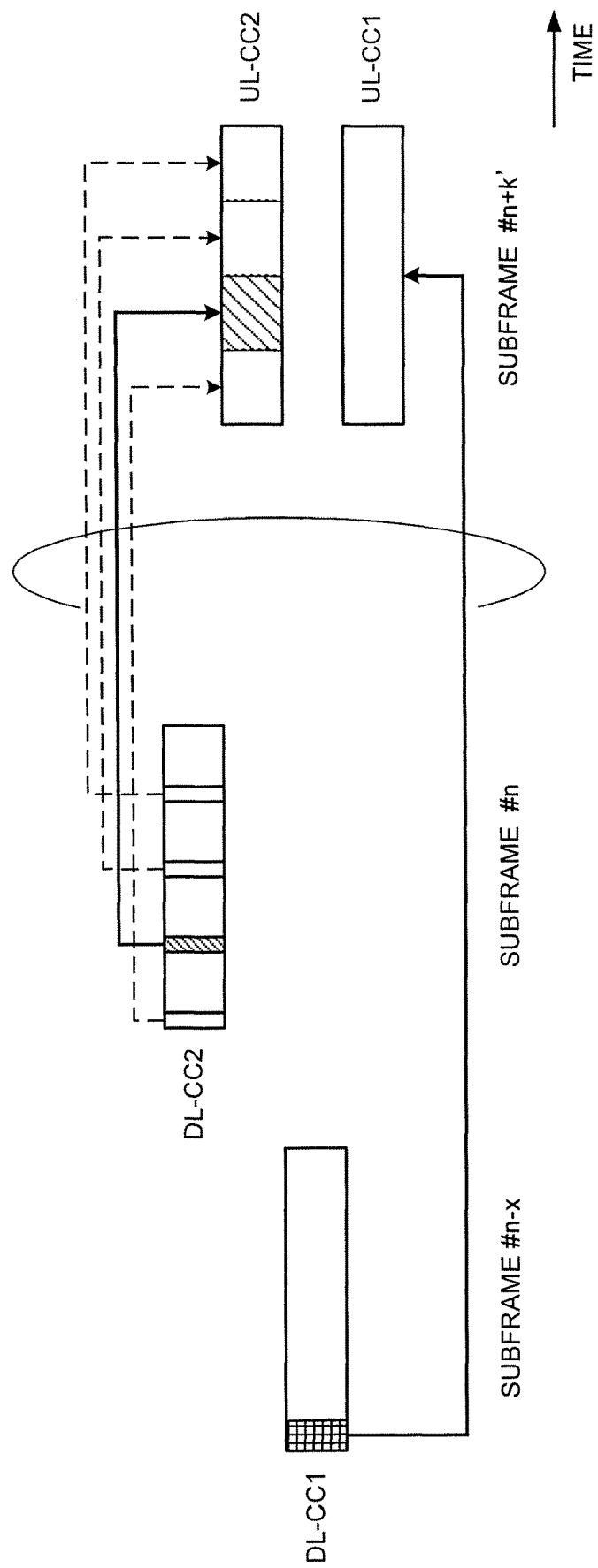
FIG. 13 is a diagram illustrating another example of the A-CSI transmission method according to the present embodiment.

FIG. 13 illustrates that, when the user terminal receives a plurality of triggers for CSI transmission that uses the same short TTI between different CCs, the user terminal controls the CSI transmission based on a lately (latest) received CSI trigger. More specifically, FIG. 13 illustrates that the user terminal performs the CSI transmission based on a second CSI trigger among a first CSI trigger received from the SF # n−x from the CC1 and the second CSI trigger received from the short TTI included in the SF # n from the CC2. In this case, it is possible to perform the CSI reporting operation by using the latest CSI trigger instructed by the radio base station. Consequently, the base station scheduler can overwrite a past CSI trigger that needs a long processing time with the CSI trigger to which a short processing time such as the short TTI is set. As a result, it is possible to perform scheduling that takes into account the latest traffic state or channel quality.

Figure 14:
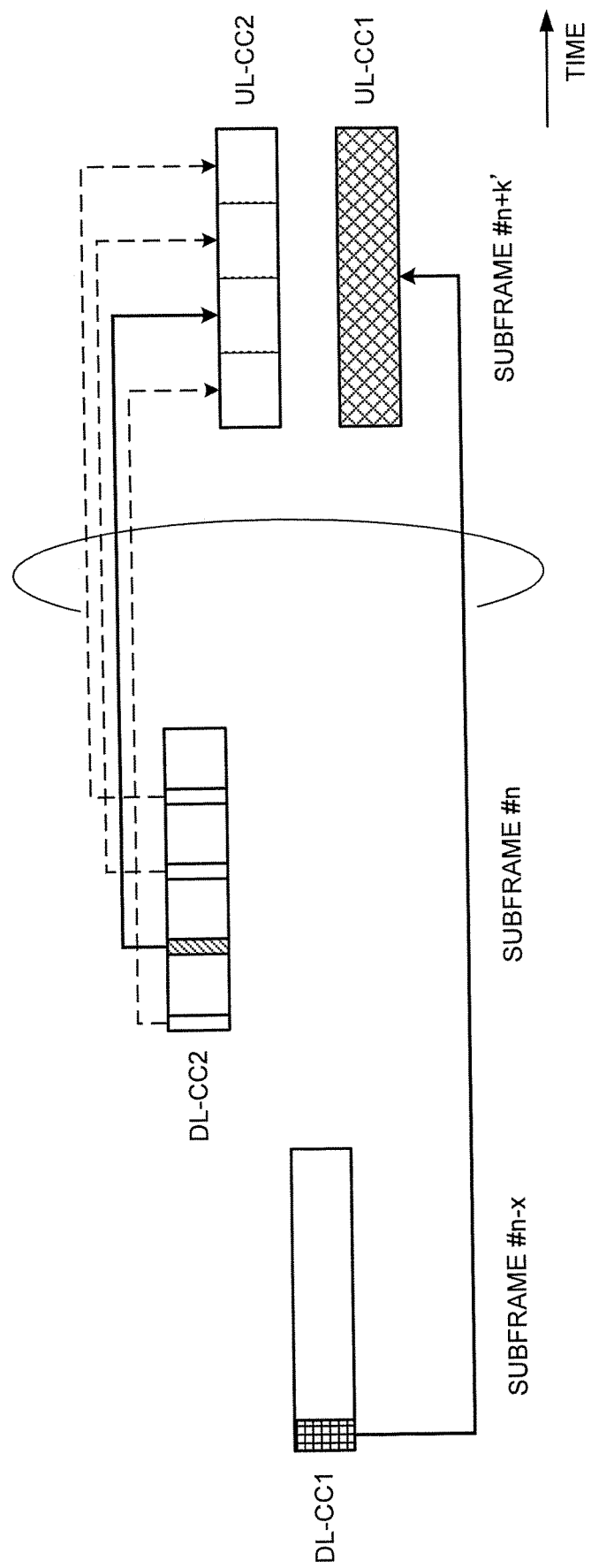
FIG. 14 is a diagram illustrating another example of the A-CSI transmission method according to the present embodiment.

FIG. 14 illustrates that, when the user terminal receives a plurality of triggers for CSI transmission that uses the same short TTI between different CCs, the user terminal controls the CSI transmission based on a firstly received CSI trigger. More specifically, FIG. 14 illustrates that the user terminal performs the CSI transmission based on a first CSI trigger among the first CSI trigger received from the SF # n−x from the CC1 and a second CSI trigger received from the short TTI included in the SF # n from the CC2. In this case, while a great processing time such as a non-short 111 is presumed, a CSI trigger included in a highly reliably control signal (DCI) is preferentially used. Consequently, it is possible to perform highly reliable scheduling control.

(Radio Communication System)

The configuration of the radio communication system according to the present embodiment will be described below. The radio communication methods according to the above aspects are applied to this radio communication system. In addition, the radio communication methods according to the above aspects may be applied alone or may be applied in combination.

Figure 15:
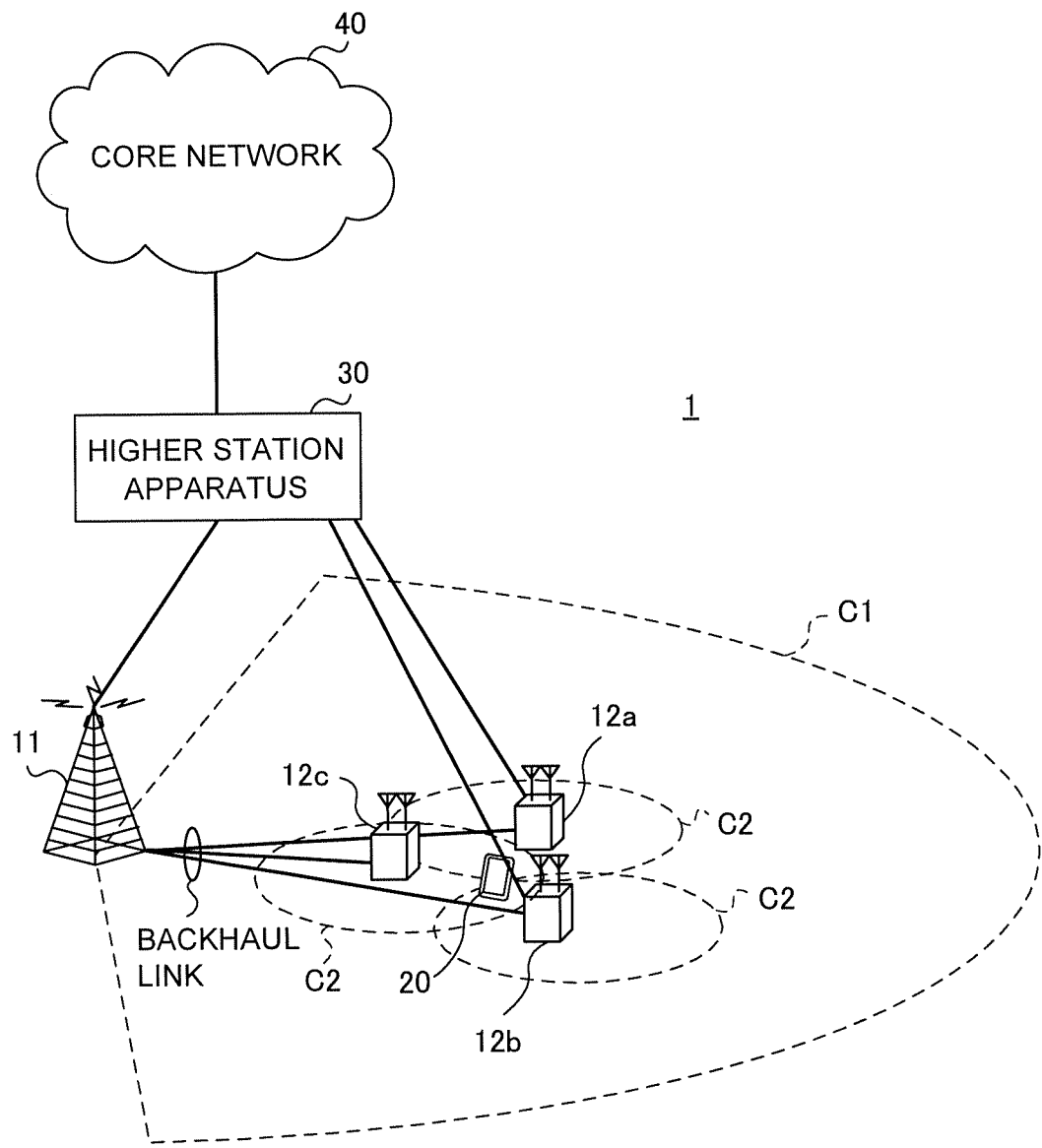
FIG. 15 is a schematic configuration diagram illustrating an example of a schematic configuration of a radio communication system according to the present embodiment.

FIG. 15 is a diagram illustrating an example of a schematic configuration of the radio communication system according to the present embodiment. A radio communication system 1 can apply Carrier Aggregation (CA) that aggregates a plurality of base frequency blocks (component carriers) whose one unit is a system bandwidth (e.g., 20 MHz) of the LTE system, and/or Dual Connectivity (DC). In this regard, the radio communication system 1 may be referred to as SUPER 3G, LTE-Advanced (LTE-A), IMT-Advanced, 4G, 5G, Future Radio Access (FRA) and New RAT (NR).

The radio communication system 1 illustrated in FIG. 15 includes a radio base station 11 that forms a macro cell C1, and radio base stations 12a to 12c that are located in the macro cell C1 and form small cells C2 narrower than the macro cell C1. Further, a user terminal 20 is located in the macro cell CI and each small cell C2. Different numerologies (e.g., different TTI lengths and/or processing times) between cells may be configured to be applied. In addition, each numerology refers to a communication parameter set that characterizes a signal design of a certain RAT or a RAT design.

The user terminal 20 can connect with both of the radio base station 11 and radio base stations 12. The user terminal 20 is assumed to concurrently use the macro cell C1 and the small cells C2 that use different frequencies by CA or DC. Further, the user terminal 20 can apply CA or DC by using a plurality of cells (CCs) (e.g., two CCs or more). Furthermore, the user terminal can use licensed band CCs and unlicensed band CCs as a plurality of cells. In addition, one of a plurality of cells can be configured to include FDD carriers and/or TDD carriers to which a short TTI is applied.

The user terminal 20 and the radio base station 11 can communicate by using a carrier (an existing carrier that is called a Legacy carrier) of a narrow bandwidth in a relatively low frequency band (e.g., 2 GHz). Meanwhile, the user terminal 20 and each radio base station 12 may use a carrier of a wide bandwidth in a relatively high frequency band (e.g., 3.5 GHz, 5 GHz or 30 to 70 GHz) or may use the same carrier as that used by the radio base station 11. In this regard, a configuration of the frequency band used by each radio base station is not limited to this.

The radio base station 11 and each radio base station 12 (or the two radio base stations 12) can be configured to be connected by cables (e.g., optical fibers compliant with a Common Public Radio Interface (CPRI) or an X2 interface) or by radio.

The radio base station 11 and each radio base station 12 are respectively connected with a higher station apparatus 30 and are connected with a core network 40 via the higher station apparatus 30. In this regard, the higher station apparatus 30 includes, for example, an access gateway apparatus, a Radio Network Controller (RNC) and a Mobility Management Entity (MME), yet is not limited to these. Further, each radio base station 12 may be connected with the higher station apparatus 30 via the radio base station 11.

In this regard, the radio base station 11 is a radio base station that has a relatively wide coverage, and may be referred to as a macro base station, an aggregate node, an eNodeB (eNB) or a transmission/reception point. Further, each radio base station 12 is a radio base station that has a local coverage, and may be referred to as a small base station, a micro base station, a pico base station, a femto base station, a Home eNodeB (HeNB), a Remote Radio Head (RRH) or a transmission/reception point. The radio base stations 11 and 12 will be collectively referred to as a radio base station 10 below when not distinguished.

Each user terminal 20 is a terminal that supports various communication schemes such as LTE and LTE-A, and may include not only a mobile communication terminal (mobile station) but also a fixed communication terminal (fixed station).

The radio communication system 1 applies Orthogonal Frequency-Division Multiple Access (OFDMA) to downlink and Single Carrier Frequency Division Multiple Access (SC-FDMA) to uplink as radio access schemes. OFDMA is a multicarrier transmission scheme that divides a frequency band into a plurality of narrow frequency bands (subcarriers) and maps data on each subcarrier to perform communication. SC-FDMA is a single carrier transmission scheme that divides a system bandwidth into a band including one or continuous resource blocks per terminal and causes a plurality of terminals to use different bands to reduce an interference between the terminals. In this regard, uplink and downlink radio access schemes are not limited to a combination of these and may use OFDMA on UL.

The radio communication system 1 uses as DL channels a DL data channel (PDSCH: Physical Downlink Shared Channel that is also referred to as a DL shared channel) shared by each user terminal 20, a broadcast channel (PBCH: Physical Broadcast Channel) and an L1/L2 control channel. User data, higher layer control information and System Information Blocks (SIB) are transmitted on the PDSCH. Further, Master Information Blocks (MIB) are transmitted on the PBCH.

The L1/L2 control channel includes DL control channels (a Physical Downlink Control Channel (PDCCH) and an Enhanced Physical Downlink Control Channel (EPDCCH)), a Physical Control Format Indicator Channel (PCFICH) and a Physical Hybrid-ARQ Indicator Channel (PHICH)). Downlink Control Information (DCI) including scheduling information of the PDSCH and the PUSCH is transmitted on the PDCCH. The number of OFDM symbols used for the PDCCH is transmitted on the PCFICH. Transmission acknowledgement information (ACK/NACK) of a HARQ for the PUSCH is transmitted on the PHICH. The EPDCCH is subjected to frequency division multiplexing with the PDSCH (downlink shared data channel) and is used to transmit DCI similar to the PDCCH.

The radio communication system 1 uses as UL channels a UL data channel (PUSCH: Physical Uplink Shared Channel that is also referred to as a UL shared channel) shared by each user terminal 20, a UL control channel (PUCCH: Physical Uplink Control Channel), and a random access channel (PRACH: Physical Random Access Channel). User data and higher layer control information are transmitted on the PUSCH. Uplink Control Information (UCI) including at least one of transmission acknowledgement information (ACK/NACK) and radio quality information (CQI) is transmitted on the PUSCH or the PUCCH. A random access preamble for establishing connection with cells is transmitted on the PRACH.

<Radio Base Station>

Figure 16:
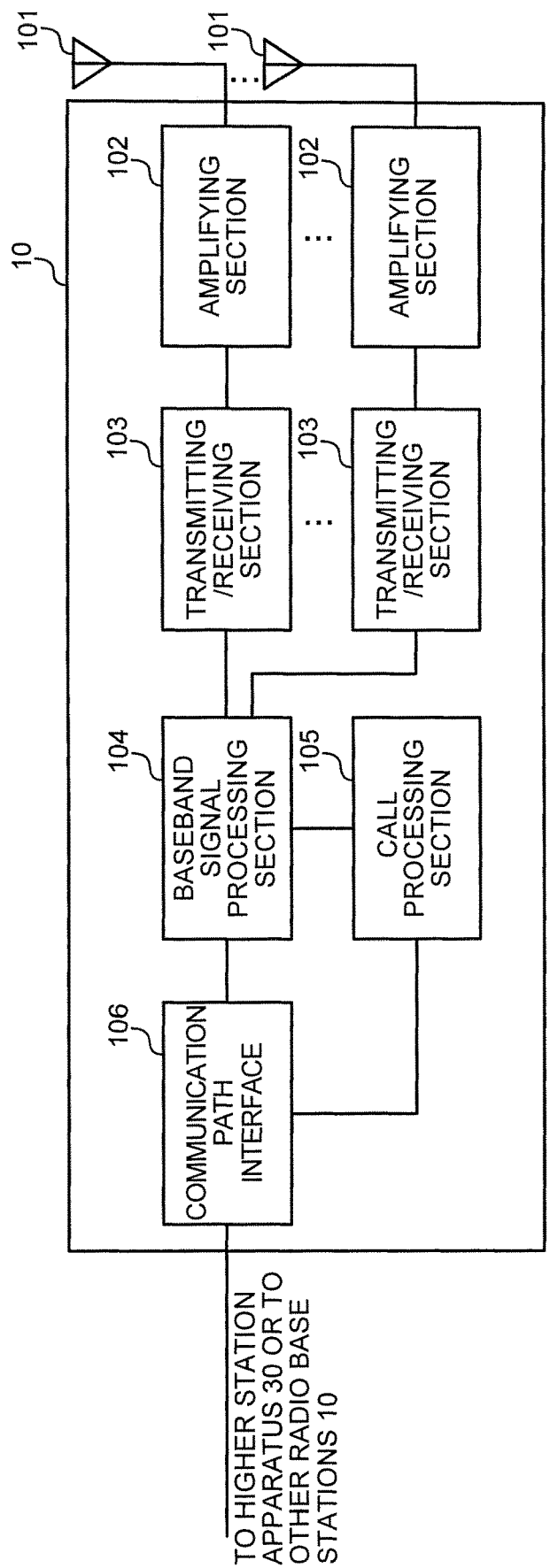
FIG. 16 is a diagram illustrating an example of an entire configuration of a radio base station according to the present embodiment.

FIG. 16 is a diagram illustrating an example of an entire configuration of the radio base station according to the present embodiment. The radio base station 10 includes pluralities of transmission/reception antennas 101, amplifying sections 102 and transmission/reception sections (transmitting/receiving sections) 103, a baseband signal processing section 104, a call processing section 105 and a channel interface (communication path interface) 106. In this regard, the radio base station 10 only needs to be configured to include one or more of each of the transmission/reception antennas 101, the amplifying sections 102 and the transmission/reception sections 103.

DL data transmitted from the radio base station 10 to the user terminal 20 is input from the higher station apparatus 30 to the baseband signal processing section 104 via the channel interface 106.

The baseband signal processing section 104 performs processing of a Packet Data Convergence Protocol (PDCP) layer, segmentation and concatenation of the DL data, transmission processing of an RLC layer such as Radio Link Control (RLC) retransmission control, Medium Access Control (MAC) retransmission control (such as HARQ transmission processing), and transmission processing such as scheduling, transmission format selection, channel coding, Inverse Fast Fourier Transform (IFFT) processing, and precoding processing on the DL data to transfer to each transmission/reception section 103. Further, the baseband signal processing section 104 performs transmission processing such as channel coding and inverse fast Fourier transform on a DL control signal, too, to transfer to each transmission/reception section 103.

Each transmission/reception section 103 converts a baseband signal precoded and output per antenna from the baseband signal processing section 104 into a radio frequency band to transmit. The radio frequency signal subjected to frequency conversion by each transmission/reception section 103 is amplified by each amplifying section 102, and is transmitted from each transmission/reception antenna 101. The transmission/reception sections 103 can be composed of transmitters/receivers, transmission/reception circuits or transmission/reception apparatuses described based on a common knowledge in a technical field according to the present invention. In this regard, the transmission/reception sections 103 may be composed as an integrated transmission/reception section or may be composed of transmission sections and reception sections.

Meanwhile, each amplifying section 102 amplifies a radio frequency signal as a UL signal received by each transmission/reception antenna 101. Each transmission/reception section 103 receives the UL signal amplified by each amplifying section 102. Each transmission/reception section 103 performs frequency conversion on the received signal into a baseband signal to output to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of an RLC layer and a PDCP layer on user data included in the input UL signal to transfer to the higher station apparatus 30 via the channel interface 106. The call processing section 105 performs call processing such as configuration and release of a communication channel, state management of the radio base station 10, and radio resource management.

The channel interface 106 transmits and receives signals to and from the higher station apparatus 30 via a predetermined interface. Further, the channel interface 106 may transmit and receive (backhaul signaling) signals to and from the another radio base station 10 via an inter-base station interface (e.g., optical fibers compliant with the Common Public Radio Interface (CPRI) or the X2 interface).

In addition, each transmission/reception section 103 transmits DL signals (e.g., a DL control signal (DL control channel), DL data signals (a DL data channel and a DL shared channel), DL reference signals (a DM-RS and a CSI-RS), a discovery signal, a synchronization signal and a broadcast signal), and receives UL signals (e.g., a UL control signal (UL control channel), UL data signals (a UL data channel and a UL shared channel) and a UL reference signal).

More specifically, each transmission/reception section 103 transmits a report request for triggering report of channel state information by applying the short TTI. In this case, each transmission/reception section 103 can transmit the report request in subframe units and/or short TTI units. Further, when the user terminal communicates with one cell or a plurality of cells to which different TTI lengths and/or different processing times are applied, each transmission/reception section 103 can transmit the report request for triggering the report of the channel state information of the same subframe and/or the same short TTI so as not to doubly transmit this report request.

Further, each transmission/reception section 103 receives the channel state information to be reported by the user terminal in the subframe units and/or the short TTI units based on the report request. Furthermore, when the user terminal communicates with one cell or a plurality of cells to which different TTI lengths and/or different processing times are applied, each transmission/reception section 103 may transmit a plurality of report requests for triggering report of channel state information of the same subframe and/or the same short TTI. In this case, each transmission/reception section 103 can receive one or a plurality of pieces of channel state information based on predetermined conditions.

The transmission section and the reception section according to the present invention are composed of the transmission/reception sections 103 and/or the channel interface 106.

Figure 17:
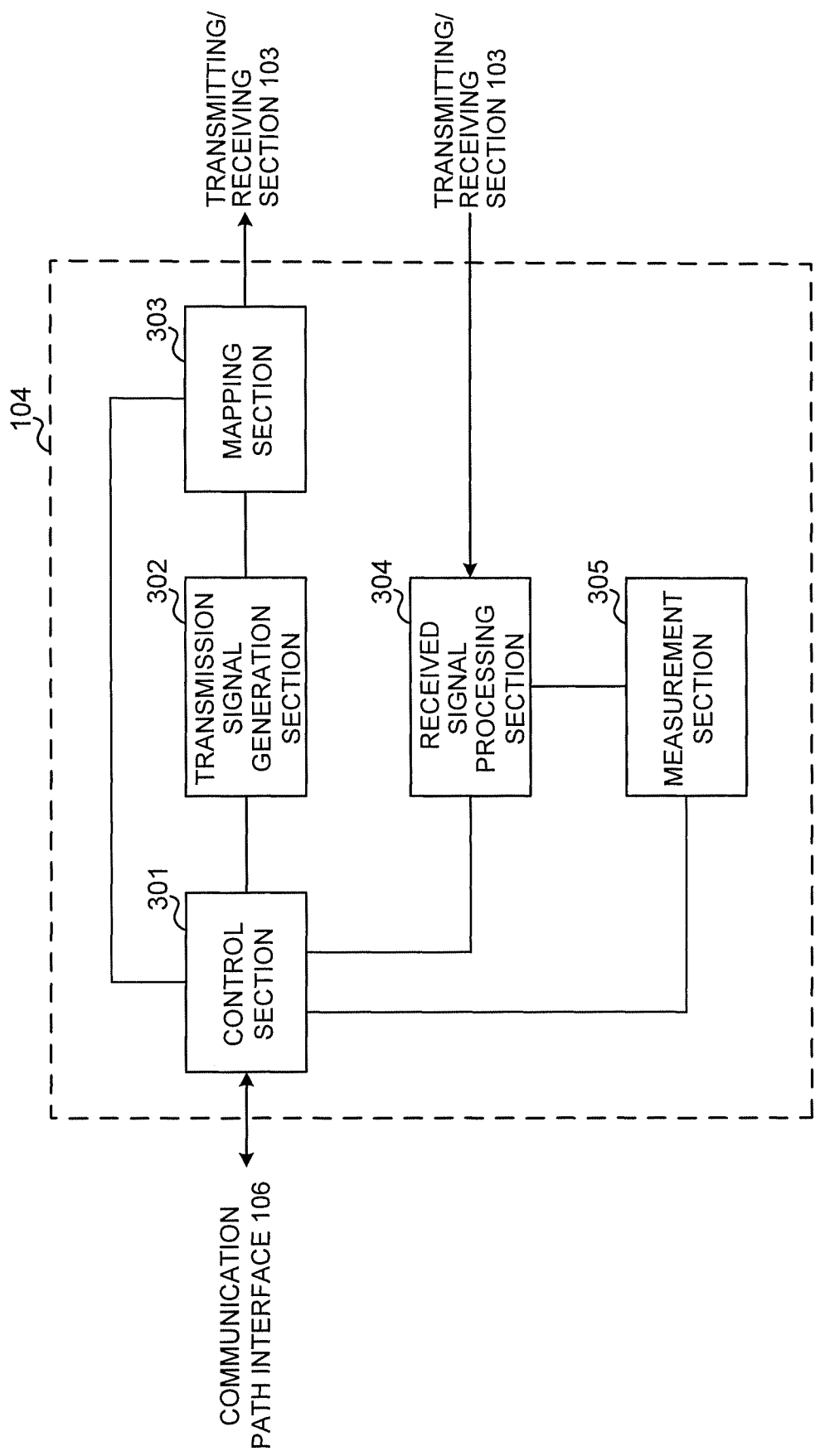
FIG. 17 is a diagram illustrating an example of a function configuration of the radio base station according to the present embodiment.

FIG. 17 is a diagram illustrating an example of a function configuration of the radio base station according to the present embodiment. In addition, FIG. 17 mainly illustrates function blocks of characteristic portions according to the present embodiment, and assumes that the radio base station 10 includes other function blocks required for radio communication, too. As illustrated in FIG. 17, the baseband signal processing section 104 includes at least a control section 301, a transmission signal generating section 302, a mapping section 303, a received signal processing section 304 and a measurement section 305.

The control section 301 controls the entire radio base station 10. The control section 301 can be composed of a controller, a control circuit or a control apparatus described based on the common knowledge in the technical field according to the present invention.

The control section 301 controls, for example, signal generation of the transmission signal generating section 302 and signal allocation of the mapping section 303. Further, the control section 301 controls signal reception processing of the received signal processing section 304 and signal measurement of the measurement section 305.

The control section 301 controls scheduling (e.g., resource allocation) of a DL signal and/or a UL signal. More specifically, the control section 301 controls the transmission signal generating section 302, the mapping section 303 and each transmission/reception section 103 to generate and transmit DCI (DL assignment) including scheduling information of a DL data channel, and DCI (UL grant) including scheduling information of a UL data channel. Further, the control section 301 performs control to include the report request (CSI request) for triggering report of channel state information in the DCI (e.g., UL grant).

Furthermore, the control section 301 performs control to transmit the report request in the subframe units and/or the short TTI units. Still further, when communicating with the user terminal by using one cell or a plurality of cells to which different TTI lengths and/or different processing times are applied, the control section 301 can perform control so as not to transmit doubly transmit the report request for triggering the CSI report of the same subframe and/or the same short TTI.

Moreover, the control section 301 may perform control to transmit a plurality of report requests for triggering the report of the channel state information of the same subframe and/or the same short TTI by using different subframes and/or TTIs of the same cell. Alternatively, the control section 301 may perform control to transmit a plurality of report requests for triggering the report of the channel state information of the same subframe and/or the same short TTI by using subframes and/or TTIs of different cells.

The transmission signal generating section 302 generates DL signals (such as a DL control channel, a DL data channel and a DL reference signal such as a DM-RS) based on an instruction from the control section 301 to output to the mapping section 303. The transmission signal generating section 302 can be composed of a signal generator, a signal generation circuit and a signal generating apparatus described based on the common knowledge in the technical field according to the present invention.

The mapping section 303 maps the DL signal generated by the transmission signal generating section 302, on a predetermined radio resource based on the instruction from the control section 301 to output to each transmission/reception section 103. The mapping section 303 can be composed of a mapper, a mapping circuit or a mapping apparatus described based on the common knowledge in the technical field according to the present invention.

The received signal processing section 304 performs reception processing (e.g., demapping, demodulation and decoding) on a received signal input from each transmission/reception section 103. In this regard, the received signal is, for example, a UL signal (such as a UL control channel, a UL data channel and a UL reference signal) transmitted from the user terminal 20. The received signal processing section 304 can be composed of a signal processor, a signal processing circuit or a signal processing apparatus described based on the common knowledge in the technical field according to the present invention.

The received signal processing section 304 outputs information decoded by the reception processing to the control section 301. For example, the received signal processing section 304 outputs at least one or a preamble, control information and UL data to the control section 301. Further, the received signal processing section 304 outputs the received signal and the signal after the reception processing to the measurement section 305.

The measurement section 305 performs measurement related to the received signal. The measurement section 305 can be composed of a measurement instrument, a measurement circuit or a measurement apparatus described based on the common knowledge in the technical field according to the present invention.

The measurement section 305 may measure, for example, received power (e.g., Reference Signal Received Power (RSRP)), received quality (e.g., Reference Signal Received Quality (RSRQ)), a Signal to Interference plus Noise Ratio (SINR)) or a channel state of the received signal. The measurement section 305 may output a measurement result to the control section 301.

<User Terminal>

Figure 18:
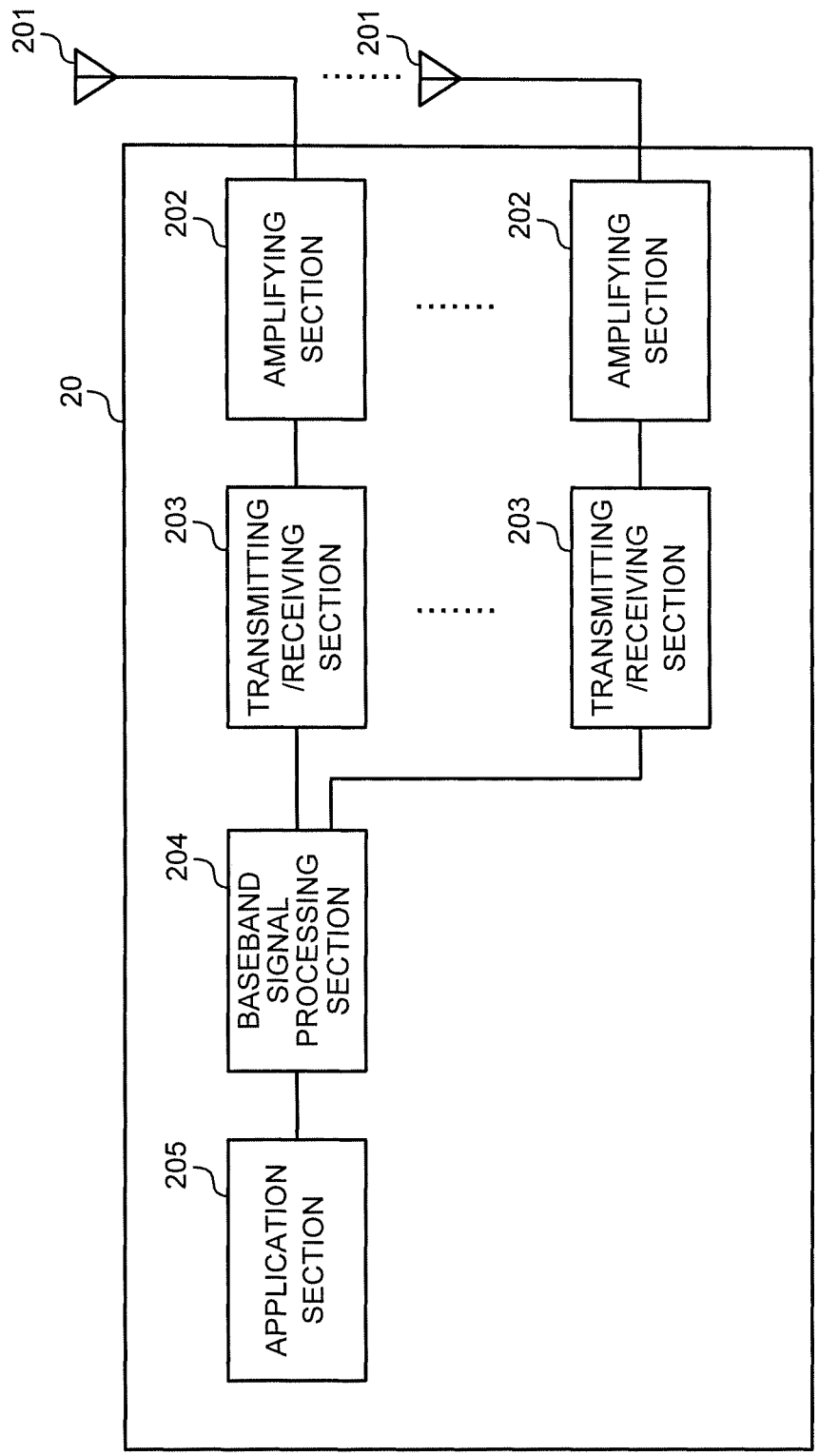
FIG. 18 is a diagram illustrating an example of an entire configuration of a user terminal according to the present embodiment.

FIG. 18 is a diagram illustrating an example of an entire configuration of the user terminal according to the present embodiment. The user terminal 20 includes pluralities of transmission/reception antennas 201, amplifying sections 202 and transmission/reception sections (transmitting/receiving sections) 203, a baseband signal processing section 204 and an application section 205. In this regard, the user terminal 20 only needs to be configured to include the one or more of each of the transmission/reception antennas 201, the amplifying sections 202 and the transmission/reception sections 203.

Each amplifying section 202 amplifies a radio frequency signal received at each transmission/reception antenna 201. Each transmission/reception section 203 receives a DL signal amplified by each amplifying section 202. Each transmission/reception section 203 performs frequency conversion on the received signal into a baseband signal to output to the baseband signal processing section 204. The transmission/reception sections 203 can be composed of transmitters/receivers, transmission/reception circuits or transmission/reception apparatuses described based on the common knowledge in the technical field according to the present invention. In this regard, the transmission/reception sections 203 may be composed as an integrated transmission/reception section or may be composed of transmission sections and reception sections.

The baseband signal processing section 204 performs FFT processing, error correcting decoding, and reception processing of retransmission control on the input baseband signal. The baseband signal processing section 204 transfers DL data to the application section 205. The application section 205 performs processing related to layers higher than a physical layer and a MAC layer. Further, the baseband signal processing section 204 transfers system information and higher layer control information among the DL data, too, to the application section 205.

Meanwhile, the application section 205 inputs UL data to the baseband signal processing section 204. The baseband signal processing section 204 performs transmission processing of retransmission control (e.g., HARQ transmission processing), channel coding, precoding, Discrete Fourier Transform (DFT) processing and IFFT processing on the UL data to transfer to each transmission/reception section 203. Each transmission/reception section 203 converts the baseband signal output from the baseband signal processing section 204 into a radio frequency band to transmit. The radio frequency signal subjected to the frequency conversion by each transmission/reception section 203 is amplified by each amplifying section 202, and is transmitted from each transmission/reception antenna 201.

In addition, each transmission/reception section 203 receives DL signals (e.g., a DL control signal (DL control channel), DL data signals (a DL data channel and a DL shared channel), DL reference signals (a DM-RS and a CSI-RS), a discovery signal, a synchronization signal and a broadcast signal), and transmits UL signals (e.g., a UL control signal (UL control channel), UL data signals (a UL data channel and a UL shared channel) and a UL reference signal).

More specifically, each transmission/reception section 203 transmits a report request for triggering report of channel state information by applying the short 111. In this case, each transmission/reception section 203 can transmit the report request in subframe units and/or short TTI units. Further, when the user terminal communicates with one cell or a plurality of cells to which different TTI lengths and/or different processing times are applied, each transmission/reception section 203 can receive the report request for triggering the report of the channel state information of the same subframe and/or the same short TTI assuming not to doubly receive this report request.

Further, each transmission/reception section 203 transmits the channel state information in the subframe units and/or the short TTI units based on the report request. Furthermore, when communicating with one cell or a plurality of cells to which different TTI lengths and/or different processing times are applied, each transmission/reception section 203 may receive a plurality of report requests for triggering report of channel state information of the same subframe and/or the same short TTI. In this case, each transmission/reception section 203 can transmit one or a plurality of pieces of channel state information based on predetermined conditions.

Figure 19:
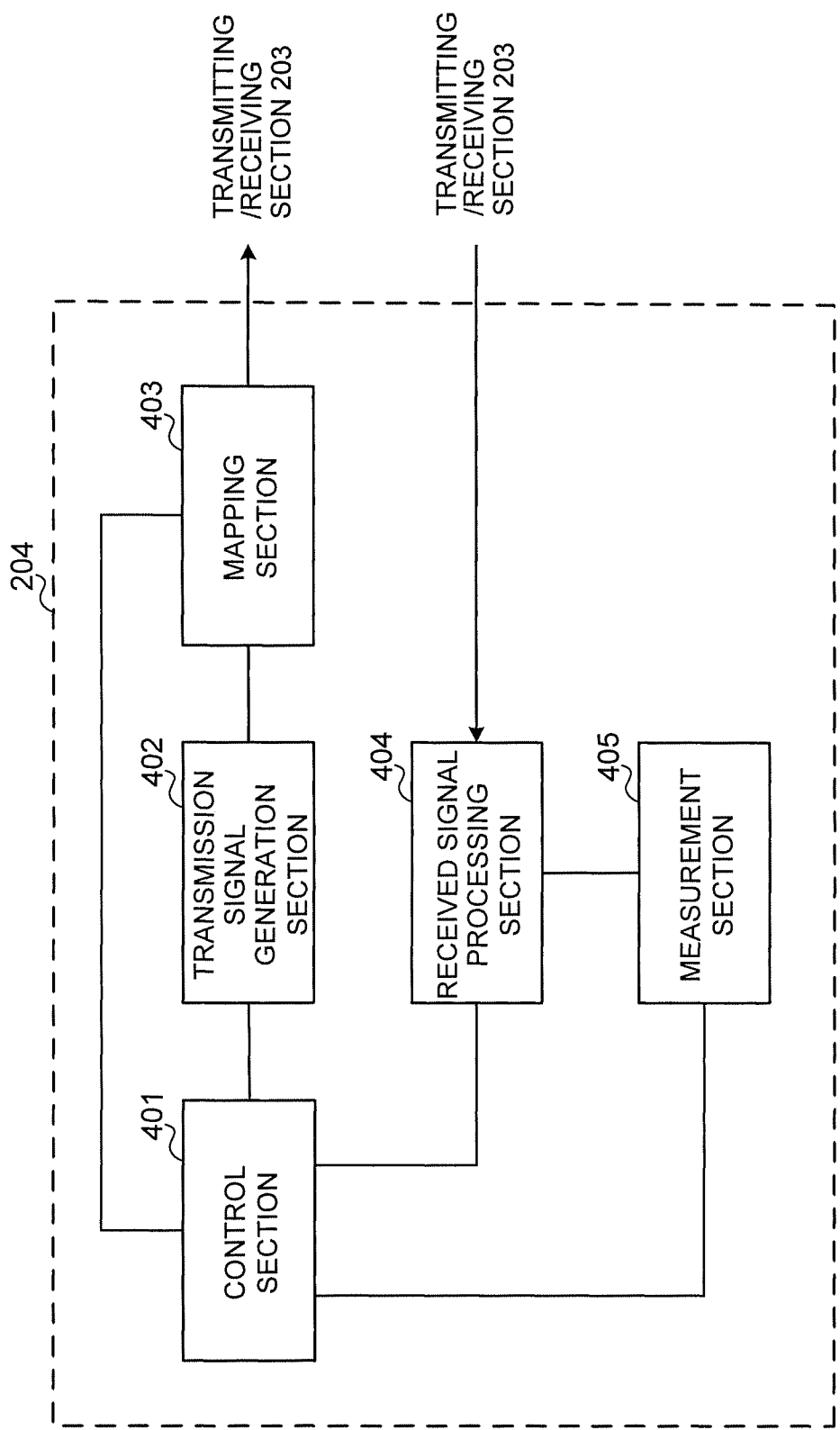
FIG. 19 is a diagram illustrating an example of a function configuration of the user terminal according to the present embodiment.

FIG. 19 is a diagram illustrating an example of a function configuration of the user terminal according to the present embodiment. In addition, FIG. 19 mainly illustrates function blocks of characteristic portions according to the present embodiment, and assumes that the user terminal 20 includes other function blocks required for radio communication, too. As shown in FIG. 19, the baseband signal processing section 204 of the user terminal 20 includes at least the control section 401, a transmission signal generating section 402, a mapping section 403, a received signal processing section 404 and a measurement section 405.

The control section 401 controls the entire user terminal 20. The control section 401 can be composed of a controller, a control circuit or a control apparatus described based on the common knowledge in the technical field according to the present invention.

The control section 401 controls, for example, signal generation of the transmission signal generating section 402 and signal allocation of the mapping section 403. Further, the control section 401 controls signal reception processing of the received signal processing section 404 and signal measurement of the measurement section 405.

The control section 401 obtains, from the received signal processing section 404, a DL control channel and a DL data channel transmitted from the radio base station 10. More specifically, the control section 401 controls each transmission/reception section 203 and the received signal processing section 404 to perform blind decoding on the DL control channel, detect DCI transmitted by a subframe and/or sDCI transmitted by a short TTI, and receive the DL data channel based on the DCI and/or the sDCI.

The control section 401 controls transmission of Channel State Information (CSI) generated based on the DL reference signal (e.g., CSI-RS). Furthermore, the control section 401 may control transmission of retransmission control information (e.g., HARQ-ACK) transmitted on the UL control channel or the UL data channel based on a result obtained by determining whether or not it is necessary to perform retransmission control on the DL data channel.

Further, the control section 401 performs control to transmit the report of the channel state information in the subframe units and/or the short TTI units based on the report request. Furthermore, the control section 401 performs control to receive the report request in the subframe units and/or the short TTI units.

Still further, when communicating with one cell or a plurality of cells to which different TTI lengths and/or different processing times are applied, the control section 401 performs control to receive the report request for triggering the report of the channel state information of the same subframe and/or the same short TTI assuming not to doubly receive the report request.

Alternatively, when communicating with one cell or a plurality of cells to which different TTI lengths and/or different processing times are applied, the control section 401 performs control to receive a plurality of report requests for triggering the report of the channel state information of the same subframe and/or the same short TTI. In this case, the control section 401 performs control to transmit one or a plurality of pieces of channel state information based on predetermined conditions.

The transmission signal generating section 402 generates a UL signal (such as a UL control channel, a UL data channel and a UL reference signal) based on an instruction from the control section 401 to output to the mapping section 403. The transmission signal generating section 402 can be composed of a signal generator, a signal generation circuit and a signal generating apparatus described based on the common knowledge in the technical field according to the present invention.

The transmission signal generating section 402 generates a UL data channel based on the instruction from the control section 401. When, for example, the DL control channel notified from the radio base station 10 includes a UL grant, the control section 401 instructs the transmission signal generating section 402 to generate a UL data channel. When the UL grant includes a CSI report request (CSI trigger), the control section 401 instructs the transmission signal generating section 402 to generate a CSI.

The mapping section 403 maps the UL signal generated by the transmission signal generating section 402, on a radio resource based on the instruction from the control section 401 to output to each transmission/reception section 203, When the downlink control information (e.g., UL grant) includes the CSI report request, the mapping section 403 maps the CSI on an uplink shared channel (e.g., PUSCH). The mapping section 403 can be composed of a mapper, a mapping circuit or a mapping apparatus described based on the common knowledge in the technical field according to the present invention.

The received signal processing section 404 performs reception processing (e.g., demapping, demodulation and decoding) on the received signal input from each transmission/reception section 203. In this regard, the received signal is, for example, a DL signal (a DL control channel, a DL data channel or a DL reference signal) transmitted from the radio base station 10. The received signal processing section 404 can be composed of a signal processor, a signal processing circuit or a signal processing apparatus described based on the common knowledge in the technical field according to the present invention. Further, the received signal processing section 404 can compose the reception section according to the present invention.

The received signal processing section 404 performs blind decoding on the DL control channel for scheduling transmission and/or reception of the DL data channel, based on the instruction of the control section 401, and performs reception processing on the DL data channel based on the DCI. Further, the received signal processing section 404 estimates a channel gain based on the DM-RS or the CRS, and demodulates the DL data channel based on the estimated channel gain.

The received signal processing section 404 outputs information decoded by the reception processing to the control section 401. The received signal processing section 404 outputs, for example, broadcast information, system information, RRC signaling and the DCI to the control section 401. The received signal processing section 404 may output a data decoding result to the control section 401. Further, the received signal processing section 404 outputs the received signal and the signal after the reception processing to the measurement section 405.

The measurement section 405 performs measurement related to the received signal. For example, the measurement section 405 measures a channel state based on a channel state measurement reference signal (CSI-RS) transmitted from the radio base station. Further, the measurement section 405 may measure received power (e.g., RSRP) and DL received quality (e.g., RSRQ) of the received signal. A measurement result may be output to the control section 401. The measurement section 405 can be composed of a measurement instrument, a measurement circuit or a measurement apparatus described based on the common knowledge in the technical field according to the present invention.

<Hardware Configuration>

The block diagrams used to describe the embodiment illustrate blocks in function units. These function blocks (components) are realized by an arbitrary combination of hardware and/or software. Further, means for realizing each function block is not limited in particular. That is, each function block may be realized by one physically and/or logically coupled apparatus or may be realized by a plurality of apparatuses formed by connecting two or more physically and/or logically separate apparatuses directly and/or indirectly (for example, via cables or by radio).

Figure 20:
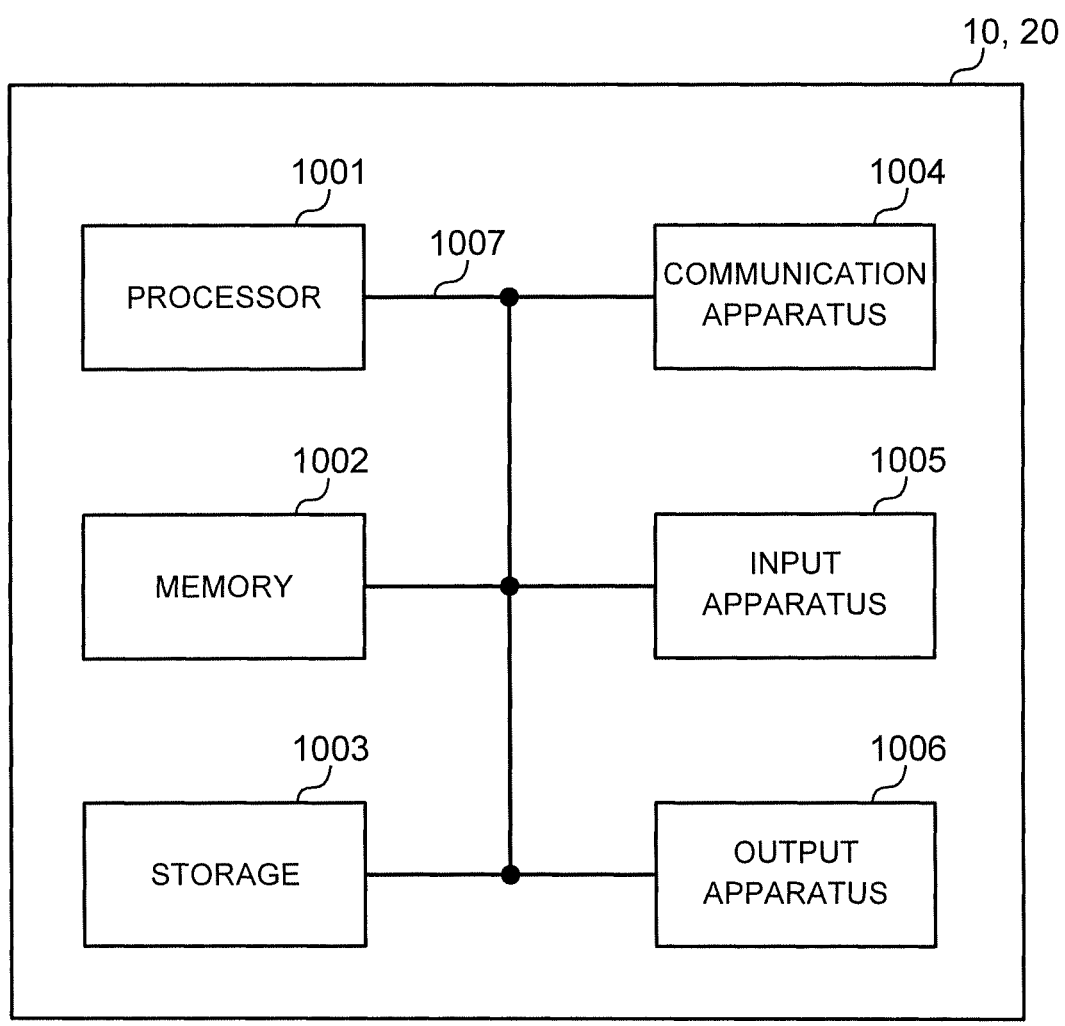
FIG. 20 is a diagram illustrating an example of hardware configurations of the radio base station and the user terminal according to the one embodiment of the present invention.

For example, the radio base station and the user terminal according to the one embodiment of the present invention may function as computers that perform processing of the radio communication method according to the present invention. FIG. 20 is a diagram illustrating an example of hardware configurations of the radio base station and the user terminal according to the one embodiment of the present invention. The above radio base station 10 and user terminal 20 may be each physically configured as a computer apparatus that includes a processor 1001, a memory 1002, a storage 1003, a communication apparatus 1004, an input apparatus 1005, an output apparatus 1006 and a bus 1007.

In this regard, a word "apparatus" in the following description can be read as a circuit, a device or a unit. The hardware configurations of the radio base station 10 and the user terminal 20 may be configured to include one or a plurality of apparatuses illustrated in FIG. 20 or may be configured without including part of the apparatuses.

For example, FIG. 20 illustrates only the one processor 1001. However, there may be a plurality of processors. Further, processing may be executed by one processor or may be executed by one or more processors concurrently, successively or by another method. In addition, the processor 1001 may be implemented by one or more chips.

Each function of the radio base station 10 and the user terminal 20 is realized by causing hardware such as the processor 1001 and the memory 1002 to read predetermined software (program), and thereby causing the processor 1001 to perform an arithmetic operation, and control communication of the communication apparatus 1004 and reading and/or writing of data in the memory 1002 and the storage 1003.

For example, the processor 1001 causes an operating system to operate to control the entire computer. The processor 1001 may be composed of a Central Processing Unit (CPU) including an interface for a peripheral apparatus, a control apparatus, an arithmetic operation apparatus and a register. For example, the baseband signal processing section 104 (204) and the call processing section 105 may be realized by the processor 1001.

Further, the processor 1001 reads programs (program codes), a software module or data from the storage 1003 and/or the communication apparatus 1004 out to the memory 1002, and executes various types of processing according to the programs, the software module or the data. Programs that cause the computer to execute at least part of the operations described in the above embodiment are used as the programs. For example, the control section 401 of the user terminal 20 may be realized by a control program stored in the memory 1002 and operated by the processor 1001 or other function blocks may be also realized likewise.

The memory 1002 is a computer-readable recording medium, and may be composed of at least one of, for example, a Read Only Memory (ROM), an Erasable Programmable ROM (EPROM), an Electrically EPROM (EEPROM), a Random Access Memory (RAM) and other appropriate storage media. The memory 1002 may be referred to as a register, a cache or a main memory (main storage apparatus). The memory 1002 can store programs (program codes) and a software module that can be executed to carry out the radio communication method according to the one embodiment of the present invention.

The storage 1003 is a computer-readable recording medium and may be composed of at least one of, for example, a flexible disk, a floppy (registered trademark) disk, a magnetooptical disk (e.g., a compact disk (Compact Disc ROM (CD-ROM)), a digital versatile disk and a Blu-ray (registered trademark) disk), a removable disk, a hard disk drive, a smart card, a flash memory device (e.g., a card, a stick or a key drive), a magnetic stripe, a database, a server and other appropriate storage media. The storage 1003 may be referred to as an auxiliary storage apparatus.

The communication apparatus 1004 is hardware (transmission/reception device) that performs communication between computers via a wired and/or radio network, and is, for example, a network device, a network controller, a network card and a communication module. The communication apparatus 1004 may be configured to include a high frequency switch, a duplexer, a filter and a frequency synthesizer to realize, for example, Frequency Division Duplex (FDD) and/or Time Division Duplex (TDD). For example, the transmission/reception antennas 101 (201), the amplifying sections 102 (202), the transmission/reception sections 103 (203) and the channel interface 106 may be realized by the communication apparatus 1004.

The input apparatus 1005 is an input device (e.g., a keyboard, a mouse, a microphone, a switch, a button or a sensor) that accepts an input from an outside. The output apparatus 1006 is an output device (e.g., a display, a speaker or a Light Emitting Diode (LED) lamp) that sends an output to the outside. In addition, the input apparatus 1005 and the output apparatus 1006 may employ an integrated configuration (e.g., touch panel).

Further, each apparatus such as the processor 1001 or the memory 1002 is connected by the bus 1007 that communicates information. The bus 1007 may be composed of a single bus or may be composed of buses that are different between apparatuses.

Further, the radio base station 10 and the user terminal 20 may be configured to include hardware such as a microprocessor, a Digital Signal Processor (DSP), an Application Specific Integrated Circuit (ASIC), a Programmable Logic Device (PLD) and a Field Programmable Gate Array (FPGA). The hardware may realize part or all of each function block. For example, the processor 1001 may be implemented by at least one of these types of hardware.

MODIFIED EXAMPLE

Each term that is described in this description and/or each term that is necessary to understand this description may be replaced with terms having identical or similar meanings. For example, a channel and/or a symbol may be signals (signaling). Further, a signal may be a message. A reference signal can be also abbreviated as a RS (Reference Signal), or may be also referred to as a pilot or a pilot signal depending on standards to be applied. Furthermore, a Component Carrier (CC) may be referred to as a cell, a frequency carrier and a carrier frequency.

Still further, a radio frame may include one or a plurality of periods (frames) in a time domain. Each of one or a plurality of periods (frames) that composes a radio frame may be referred to as a subframe. Further, the subframe may include one or a plurality of slots in the time domain. Furthermore, the slot may include one or a plurality of symbols (Orthogonal Frequency Division Multiplexing (OFDM) symbols or Single Carrier Frequency Division Multiple Access (SC-FDMA) symbols) in the time domain.

All of the radio frame, the subframe, the slot and the symbol indicate time units for transmitting signals. The other corresponding names of the radio frame, the subframe, the slot and the symbol may be used. For example, one subframe may be referred to as a Transmission Time Interval (TTI). A plurality of continuous subframes may be referred to as TTIs. One slot may be referred to as a TTI. That is, the subframe or the TTI may be a subframe (1 ms) according to existing LTE, may be a period (e.g., 1 to 13 symbols) shorter than 1 ms or may be a period longer than 1 ms.

In this regard, the TTI refers to, for example, a minimum time unit for scheduling for radio communication. For example, in the LTE system, the radio base station performs scheduling for allocating radio resources (a frequency bandwidth or transmission power that can be used by each user terminal) in TTI units to each user terminal. In this regard, a definition of the TTI is not limited to this. The TTI may be a transmission time unit of a data packet (transport block) subjected to channel coding, or may be a processing unit of scheduling or link adaptation.

The TTI having 1 ms in time duration may be referred to as a general TTI (TTIs according to LTE Rel. 8 to 12), a normal TTI, a long TTI, a general subframe, a normal subframe or a long subframe. A TTI shorter than the general TTI may be referred to as a short TTI, a short TTI, a short subframe or a short subframe.

Resource Blocks (RBs) are resource block allocation units of the time domain and the frequency domain, and may include one or a plurality of continuous subcarriers in the frequency domain. Further, the RB may include one or a plurality of symbols in the time domain or may have a length of one slot, one subframe or one TTI. One TTI or one subframe may include one or a plurality of resource blocks. In this regard, the RB may be referred to as a Physical Resource Block (PRB: Physical RB), a PRB pair or a RB pair.

Further, the resource block may include one or a plurality of Resource Elements (REs). For example, one RE may be a radio resource domain of one subcarrier and one symbol.

In this regard, structures of the radio frame, the subframe, the slot and the symbol are only exemplary structures. For example, configurations such as the number of subframes included in a radio frame, the number of slots included in a subframe, the numbers of symbols and RBs included in a slot, the number of subcarriers included in a RB, the number of symbols in a TTI, a symbol length and a Cyclic Prefix (CP) length can be variously changed.

Still further, the pieces of information and parameters described in this description may be expressed by absolute values, may be expressed by relative values with respect to predetermined values or may be expressed by other pieces of corresponding information. For example, a radio resource may be indicated by a predetermined index. Further, numerical expressions used for these parameters may be different from those explicitly disclosed in this description.

Names used for parameters in this description are by no means restrictive. For example, various channels (the Physical Uplink Control Channel (PDCCH) and the Physical Downlink Control Channel (PDCCH)) and information elements can be identified based on various suitable names. Therefore, various names allocated to these various channels and information elements are by no means restrictive.

The pieces of information and the signals described in this description may be expressed by using one of various different techniques. For example, the data, the instructions, the commands, the pieces of information, the signals, the bits, the symbols and the chips mentioned in the above entire description may be expressed as voltages, currents, electromagnetic waves, magnetic fields or magnetic particles, optical fields, photons or arbitrary combinations thereof.

Further, the pieces of information and the signals can be output from a higher layer to a lower layer and/or from the lower layer to the higher layer. The pieces of information and the signals may be input and output via a plurality of network nodes.

The input and output pieces of information and signals may be stored in a specific location (e.g., memory) or may be managed by a management table. The input and output pieces of information and signals can be overwritten, updated or additionally written. The output pieces of information and signals may be deleted. The input pieces of information and signals may be transmitted to other apparatuses.

Information may be notified not only according to the aspects/embodiment described in this description but also by other methods. For example, the information may be notified by physical layer signaling (e.g., Downlink Control Information (DCI) and Uplink Control Information (UCI)), higher layer signaling (e.g., Radio Resource Control (RRC) signaling, broadcast information (Master Information Blocks (MIB) and System Information Blocks (SIB)), and Medium Access Control (MAC) signaling), other signals or combinations thereof.

In addition, the physical layer signaling may be referred to as Layer 1/Layer 2 (L1/L2) control information (L1/L2 control signal) or L1 control information (L1 control signal). Further, the RRC signaling may be referred to as an RRC message, and may be, for example, an RRC Connection Setup message or an RRC Connection Reconfiguration message. Furthermore, the MAC signaling may be notified by, for example, a MAC Control Element (MAC CE).

Still further, predetermined information (e.g., notification of "being X") may be not only explicitly notified but also implicitly notified (by, for example, not notifying this predetermined information or by notifying another information).

Determination may be performed based on a value (0 or 1) expressed by one bit, may be performed based on a boolean expressed by true or false or may be performed by comparing numerical values (e.g., comparison with predetermined value).

Irrespectively of whether software is referred to as software, firmware, middleware, a microcode or a hardware description language or as other names, the software should be widely interpreted to mean an instruction, an instruction set, a code, a code segment, a program code, a program, a subprogram, a software module, an application, a software application, a software package, a routine, a subroutine, an object, an executable file, an execution thread, a procedure or a function.

Further, software, instructions and information may be transmitted and received via transmission media. When, for example, the software is transmitted from websites, servers or other remote sources by using wired techniques (e.g., coaxial cables, optical fiber cables, twisted pairs and Digital Subscriber Lines (DSL)) and/or radio techniques (e.g., infrared rays and microwaves), these wired techniques and/or radio technique are included in a definition of the transmission media.

The terms "system" and "network" used in this description are compatibly used.

In this description, the terms "Base Station (BS)", "radio base station", "eNB", "cell", "sector", "cell group", "carrier" and "component carrier" can be compatibly used. The base station is referred to as a fixed station, a NodeB, an eNodeB (eNB), an access point, a transmission point, a reception point, a femtocell or a small cell in some cases.

The base station can accommodate one or a plurality of (e.g., three) cells (also referred to as sectors). When the base station accommodates a plurality of cells, an entire coverage area of the base station can be partitioned into a plurality of smaller areas. Each small area can provide communication service via a base station subsystem (e.g., indoor small base station (RRH: Remote Radio Head)). The term "cell" or "sector" indicates part or the entirety of the coverage area of the base station and/or the base station subsystem that provides communication service in this coverage.

In this description, the terms "Mobile Station (MS)", "user terminal", "User Equipment (UE)" and "terminal" can be compatibly used. The base station is referred to as the term such as a fixed station, a NodeB, an eNodeB (eNB), an access point, a transmission point, a reception point, a femtocell or a small cell in some cases.

A person skilled in the art calls the mobile station as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client or some other appropriate terms in some cases.

Further, the radio base station in this description may be read as the user terminal. For example, each aspect/embodiment of the present invention may be applied to a configuration where communication between the radio base station and the user terminal is replaced with communication between a plurality of user terminals (D2D: Device-to-Device). In this case, the user terminal 20 may be configured to include the functions of the radio base station 10. Further, words such as "uplink" and "downlink" may be read as "sides". For example, the uplink channel may be read as a side channel.

Similarly, the user terminal in this description may be read as the radio base station. In this case, the radio base station 10 may be configured to include the functions of the user terminal 20.

In this description, specific operations performed by the base station are performed by an upper node of this base station depending on cases. It is obvious that, in a network including one or a plurality of network nodes of the base stations, various operations performed to communicate with a terminal can be performed by base stations or one or more network nodes (that are, for example, Mobility Management Entities (MME) or Serving-Gateways (S-GW) yet are not limited to these) other than the base stations or a combination of these.

Each aspect/embodiment described in this description may be used alone, may be used in combination or may be switched and used when carried out. Further, orders of the processing procedures, the sequences and the flowchart of each aspect/embodiment described in this description may be rearranged unless contradictions arise. For example, the method described in this description presents various step elements in an exemplary order and is not limited to the presented specific order.

Each aspect/embodiment described in this description may be applied to Long Term Evolution (LTE), LTE-Advanced (LTE-A), LTE-Beyond (LTE-B), SUPER 3G, IMT-Advanced, the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSM) (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other appropriate radio communication methods and/or next-generation systems that are enhanced based on these systems.

The phrase "based on" used in this description does not mean "based only on" unless specified otherwise. In other words, the phrase "based on" means both of "based only on" and "based at least on".

Every reference to elements that use names such as "first" and "second" used in this description does not generally limit the quantity and the order of these elements. These names can be used in this description as a convenient method for distinguishing between two or more elements. Hence, the reference to the first and second elements does not mean that only two elements can be employed or the first element should precede the second element in some way.

The term "determining (deciding)" used in this description includes diverse operations in some cases. For example, "determining (deciding)" may be regarded to "determine (decide)" "calculating", "computing", "processing", "deriving", "investigating", "looking up" (e.g., looking up in a table, a database or another data structure) and "ascertaining". Further, "determining (deciding)" may be regarded to "determine (decide)" "receiving" (e.g., receiving information), "transmitting" (e.g., transmitting information), "input", "output" and "accessing" (e.g., accessing data in a memory). Further, "determining (deciding)" may be regarded to "determine (decide)" "resolving", "selecting", "choosing", "establishing" and "comparing". That is, "determining (deciding)" may be regarded to "determine (decide)" some operation.

The words "connected" and "coupled" used in this description or every modification of these words can mean direct or indirect connection or coupling between two or more elements, and can include that one or more intermediate elements exist between the two elements "connected" or "coupled" with each other. The elements may be coupled or connected physically, logically or by a combination of physical and logical connections. It can be understood that, when used in this description, the two elements are "connected" or "coupled" with each other by using one or more electric wires, cables and/or printed electrical connection, and by using electromagnetic energy having wavelengths in radio frequency domains, microwave domains and (both of visible and invisible) light domains in some non-restrictive and incomprehensive examples.

When the words "including" and "comprising" and modifications of these words are used in this description and the claims, these words intend to be comprehensive similar to the word "have". Further, the word "or" used in this description and the claims intends not to be exclusive OR.

The present invention has been described in detail above, yet it is obvious for a person skilled in the art that the present invention is not limited to the embodiment described in this description. The present invention can be carried out as modified and changed aspects without departing from the gist and the scope of the present invention defined by the recitation of the claims. Accordingly, the disclosure of this description intends for illustrative explanation, and does not have any restrictive meaning to the present invention.

This application claims priority to Japanese Patent Application No. 2016-137917 filed on Jul. 12, 2016, the entire contents of which are incorporated by reference herein.

The invention claimed is:

1. A terminal comprising:
a transmitter that transmits channel state information using a short transmission time interval (TTI) that is shorter than a subframe based on a downlink control information which triggers a channel state information; and
a processor that, when uplink transmission is performed using a single carrier, controls a plurality of channel state information, triggered by different downlink control information, so as not to be transmitted in an overlapping time domain,
wherein when a plurality of carriers are used to perform uplink transmission, if the transmission timing of the plurality of channel state information overlaps in a time domain, then the processor allows transmission of the plurality of channel state information,
wherein the channel state information trigger is transmitted using one short TTI in a downlink subframe, and
wherein the processor controls to transmit, based on one channel state information trigger, a plurality of channel state information in different short TTIs respectively.

2. The terminal according to claim 1, wherein, when transmission timings of the plurality of channel state information in a same carrier are respectively configured in different time domains in a same subframe, then the processor allows transmission of the plurality of channel state information.

3. A radio communication method comprising:
transmitting channel state information using a short transmission time interval (TTI) that is shorter than a subframe based on a downlink control information which triggers a channel state information; and
when uplink transmission is performed using a single carrier, controlling a plurality of channel state information, triggered by different downlink control information, so as not to be transmitted in an overlapping time domain,
wherein when a plurality of carriers are used to perform uplink transmission, if the transmission timing of the plurality of channel state information overlaps in a time domain, then the transmission of the plurality of channel state information is allowed,
wherein the channel state information trigger is transmitted using one short TTI in a downlink subframe, and
wherein a plurality of channel state information are transmitted, based on one channel state information trigger, in different short TTIs respectively.

4. A base station comprising:
a receiver that receives channel state information transmitted using a short transmission time interval (TTI) that is shorter than a subframe based on a downlink control information which triggers a channel state information; and
a processor that, when uplink transmission is performed using a single carrier, controls so as not to receive a plurality of channel state information from a terminal, triggered by different downlink control information, in an overlapping time domain,
wherein when a plurality of carriers are used to perform uplink transmission, if the transmission timing of the plurality of channel state information overlaps in a time domain, then the processor allows reception of the plurality of channel state information,
wherein the channel state information trigger is transmitted using one short TTI in a downlink subframe, and
wherein the processor controls to receive, based on one channel state information trigger, a plurality of channel state information in different short TTIs respectively.

5. A system comprising:
a base station; and
a terminal comprising:
a transmitter that transmits, to the base station, channel state information using a short transmission time interval (TTI) that is shorter than a subframe based on a downlink control information which triggers a channel state information; and
a processor that, when uplink transmission is performed using a single carrier, controls a plurality of channel state information, triggered by different downlink control information, so as not to be transmitted to the base station in an overlapping time domain,
wherein when a plurality of carriers are used to perform uplink transmission, if the transmission timing of the plurality of channel state information overlaps in a time domain, then the processor allows transmission of the plurality of channel state information,
wherein the channel state information trigger is transmitted using one short TTI in a downlink subframe, and
wherein the processor controls to transmit, based on one channel state information trigger, a plurality of channel state information in different short TTIs respectively.

* * * * *